United States Patent
Kobayashi et al.

(10) Patent No.: US 6,735,641 B1
(45) Date of Patent: May 11, 2004

(54) PERIPHERAL EQUIPMENT MANAGEMENT DEVICE, A PERIPHERAL DEVICE CONNECTED TO A PERIPHERAL MANAGEMENT DEVICE, AND A METHOD OF THE SAME OF EXECUTING A PROCESS IN ACCORDANCE WITH A PROCESS SCHEDULE GENERATED ON THE BASIS OF INFORMATION SENT FROM A DEVICE AND TRANSMITTING A RESULT TO A MONITORING DEVICE

(75) Inventors: Sumitake Kobayashi, Kawasaki (JP); Mamoru Mochizuki, Kawasaki (JP); Tsuneo Mayuzumi, Kawasaki (JP); Kota Ariyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/427,035

(22) Filed: Oct. 26, 1999

(30) Foreign Application Priority Data

Oct. 28, 1998 (JP) .......................... 10-307580

(51) Int. Cl.⁷ .......................... G06F 13/10; G06F 11/30
(52) U.S. Cl. .............................. 710/15; 710/19; 710/6; 702/182; 714/47
(58) Field of Search .............. 700/11–19; 399/8–10; 702/182–185, 188; 710/15, 18, 19, 6; 714/47–49, 57; 709/223, 224; 358/1.15

(56) References Cited

U.S. PATENT DOCUMENTS

| | | | | |
|---|---|---|---|---|
| 5,225,997 A | * | 7/1993 | Lederer et al. ............. | 340/506 |
| 5,282,127 A | * | 1/1994 | Mii ........................... | 340/3.43 |
| 5,347,346 A | | 9/1994 | Shimizu et al. | |
| 5,361,265 A | * | 11/1994 | Weinberger et al. .......... | 399/8 |
| 5,548,535 A | * | 8/1996 | Zvonar ........................ | 702/81 |
| 5,650,940 A | * | 7/1997 | Tonozuka et al. ........... | 709/224 |
| 5,786,994 A | * | 7/1998 | Friz et al. .................... | 700/79 |
| 5,919,258 A | * | 7/1999 | Kayashima et al. ........ | 713/201 |
| 6,021,284 A | * | 2/2000 | Serizawa et al. ............ | 399/16 |
| 6,032,001 A | * | 2/2000 | Miyawaki .................... | 399/18 |
| 6,108,492 A | * | 8/2000 | Miyachi ..................... | 358/1.15 |
| 6,571,147 B1 | * | 5/2003 | Kashihara ................... | 700/100 |

FOREIGN PATENT DOCUMENTS

| | | |
|---|---|---|
| JP | 3-196053 | 8/1991 |
| JP | 3-239059 | 10/1991 |
| JP | 4-102868 | 4/1992 |
| JP | 8-202509 | 8/1996 |
| JP | 9-128341 | 5/1997 |

OTHER PUBLICATIONS

English Translation of JP09128341A2 from JPO Industrial Property Digital Library.

* cited by examiner

Primary Examiner—Ilwoo Park
(74) Attorney, Agent, or Firm—Staas & Halsey LLP

(57) ABSTRACT

A peripheral equipment management device and method for integrally managing peripheral equipment connected via a network are provided. In the peripheral equipment management device, a command is given to a plurality of printers at predetermined intervals. The peripheral equipment management device receives responses from the printers, stores the responses, and reports the responses to a monitoring device which monitors the printers.

18 Claims, 42 Drawing Sheets

FIG. 19

INTERNAL INFORMATION TABLE 81

```
SHEET TRANSPORTATION TIME
NUMBER OF PIT RETRY OPERATIONS
TONER CONTROL SENSOR OUTPUT VALUE
TONER SUPPLY COUNTER VALUE
DEVELOPER LIFE COUNTER VALUE
DRUM LIFE COUNTER VALUE
VARIOUS ERROR INFORMATION
              :
```

FIG. 20

PRINTER SETTING TABLE 85

```
EMULATION
          :
          :
  (VARIOUS OPERATION MODES)
          :
          :
```

FIG. 27A
TIMETABLE

| START TIME: /MONTH/DAY/HOUR/MINUTE | FLAG | PROCESS 1 POINTER |
|---|---|---|
| START TIME: /MONTH/DAY/HOUR/MINUTE | FLAG | PROCESS 2 POINTER |
| . | . | . |
| START TIME: /MONTH/DAY/HOUR/MINUTE | FLAG | PROCESS X POINTER |

— EXECUTION WAITING
— IN EXECUTION
— EXECUTION COMPLETED

FIG. 27B
PROCESS TABLE

| INITIAL VALUE OF THE PROCESS 1 SCHEDULE STACK POINTER |
|---|
| NUMBER OF PRINTERS TO BE PROCESSED |
| IP ADDRESS 1 OF A PRINTER TO BE PROCESSED |
| . |
| IP ADDRESS n OF A PRINTER TO BE PROCESSED |
| NUMBER OF TRANSMISSION/ COMMUNICATION MEANS |
| TRANSMISSION/COMMUNICATION MEANS 1 |
| NUMBER OF TRANSMISSION DESTINATIONS OF THE TRANSMISSION/COMMUNICATION MEANS 1 |
| TRANSMISSION DESTINATION 1 OF THE TRANSMISSION/COMMUNICATION MEANS 1 |
| . |
| TRANSMISSION DESTINATION n OF THE TRANSMISSION/COMMUNICATION MEANS 1 |
| . |
| TRANSMISSION/COMMUNICATION MEANS m |
| NUMBER OF TRANSMISSION DESTINATIONS OF THE TRANSMISSION/COMMUNICATION MEANS m |
| TRANSMISSION DESTINATION 1 OF THE TRANSMISSION/COMMUNICATION MEANS m |
| . |
| TRANSMISSION DESTINATION n OF THE TRANSMISSION/COMMUNICATION MEANS m |
| INITIAL VALUE OF THE PROCESS 2 SCHEDULE STACK POINTER |
| . |
| . |
| INITIAL VALUE OF THE PROCESS X SCHEDULE STACK POINTER |
| . |
| . |

PROCESS SCHEDULE STACK

THE OPERATION ENDS WHEN THE STACK POINTER IS "EMPTY"

FIG. 29

| CONTROL CODE | PROCESS CODE ※ | MEANING |
|---|---|---|
| Do | (PROCESS CODE) | TO EXECUTE A PROCESS REPRESENTED BY THE PROCESS CODE |
| Result | (Don't care) | TO RESERVE A REGION FOR THE PROCESS RESULT |
| Result Good | (Don't care) | TO INDICATE THAT THE EXECUTION RESULT OF THE FIRST "DO" (PROCESS CODE) IS "GOOD" AND THE RESULT IS EFFECTIVE UNTIL "END" |
| Result NG | (Don't care) | TO INDICATE THAT THE EXECUTION RESULT OF THE FIRST "DO" (PROCESS CODE) IS "NG (NO GOOD)" AND THE RESULT IS EFFECTIVE UNTIL "END" |
| Result True | (Don't care) | TO INDICATE THAT THE EXECUTION RESULT OF THE FIRST "DO" (PROCESS CODE) IS "TRUE" AND THE RESULT IS EFFECTIVE UNTIL "END" |
| Result False | (Don't care) | TO INDICATE THAT THE EXECUTION RESULT OF THE FIRST "DO"(PROCESS CODE) IS "FALSE" AND THE RESULT IS EFFECTIVE UNTIL "END" |
| Result Good then Do | (PROCESS CODE) | TO EXECUTE A PROCESS REPRESENTED BY THE PROCESS CODE WHEN THE EXECUTION RESULT OF THE FIRST "DO" (PROCESS CODE ) IS "GOOD" |
| Result NG then Do | (PROCESS CODE) | TO EXECUTE A PROCESS REPRESENTED BY THE PROCESS CODE WHEN THE EXECUTION RESULT OF THE FIRST "DO" (PROCESS CODE ) IS "NG" |
| Result True then Do | (PROCESS CODE) | TO EXECUTE A PROCESS REPRESENTED BY THE PROCESS CODE WHEN THE EXECUTION RESULT OF THE FIRST "DO" ( PROCESS CODE ) IS "TRUE" |
| Result False then Do | (PROCESS CODE) | TO EXECUTE A PROCESS REPRESENTED BY THE PROCESS CODE WHEN THE EXECUTION RESULT OF THE FIRST "DO" (PROCESS CODE ) IS "FALSE" |
| End | (Don't care) | TO INDICATE THAT THE SERIES OF PROCESSES STARTED BY "DO" (PROCESS CODE) HAS ENDED |

※EACH "PROCESS CODE" IS MADE UP OF A PROCESS OUTLINE CODE AND A PROCESS DETAIL CODE (PARAMETER)

FIG. 39A

PRINTER 1 FILTERING TABLE

| FILTERING CONDITION 1 | FLAG | POINTER |
|---|---|---|
| FILTERING CONDITION 2 | FLAG | POINTER |
| FILTERING CONDITION 3 | FLAG | POINTER |
| ......... | | |
| FILTERING CONDITION N | FLAG | POINTER |

PRINTER N FILTERING TABLE

| FILTERING CONDITION 1 | FLAG | POINTER |
|---|---|---|
| FILTERING CONDITION 2 | FLAG | POINTER |
| FILTERING CONDITION 3 | FLAG | POINTER |
| ......... | | |
| FILTERING CONDITION N | FLAG | POINTER |

FLAG: "APPLIED" / "NOT APPLIED"

FIG. 39B

FILTERING PROCESS TABLE

| MESSAGE OF THE SATISFIED CONDITION |
|---|
| NUMBER OF TRANSMISSION/COMMUNICATION MEANS |
| TRANSMISSION/COMMUNICATION MEANS 1 |
| NUMBER OF TRANSMISSION DESTINATIONS OF THE TRANSMISSION/COMMUNICATION MEANS 1 |
| TRANSMISSION DESTINATION 1 OF THE TRANSMISSION/COMMUNICATION MEANS 1 |
| ...... |
| TRANSMISSION DESTINATION N OF THE TRANSMISSION/COMMUNICATION MEANS 1 |
| ...... |
| TRANSMISSION/COMMUNICATION MEANS M |
| NUMBER OF TRANSMISSION DESTINATIONS OF THE TRANSMISSION/COMMUNICATION MEANS M |
| TRANSMISSION DESTINATION 1 OF THE TRANSMISSION/COMMUNICATION MEANS M |
| ...... |
| TRANSMISSION DESTINATION N OF THE TRANSMISSION/COMMUNICATION MEANS M |

FIG. 42A

◎PROCESS REQUESTS THROUGH EMAIL·· WRITE THE
FOLLOWING COMMANDS IN A MESSAGE BY EMAIL

| COMMAND | SUBCOMMAND | PARAMETER | MEANING |
|---|---|---|---|
| Set | Target.Printer.Ip | IP ADDRESS | SELECT A PRINTER INDICATED BY THE IP ADDRESS |
| | Target.Printer.Name | PRINTER NAME | SELECT A PRINTER REPRESENTED BY THE PRINTER NAME |
| | Target.Printer.Model | MODEL | SELECT ALL PRINTERS REPRESENTED BY THE MODEL NAME |
| | Response.Route.Mail.Address | MAIL ADDRESS | SEND THE PROCESS RESULT AT THE DESIGNATED ADDRESS BY EMAIL |
| | Response.Route.Fax.No | FAX NUMBER | SEND THE PROCESS RESULT AT THE DESIGNATED NUMBER BY FAX |
| | Response.Route.Tel.No | TELEPHONE NUMBER | SEND THE PROCESS RESULT AT THE DESIGNATED NUMBER BY VOICE TELEPHONE |
| | ActionTiming.MDMS | DATE AND TIME | DESIGNATE THE TIME FOR PROCESS EXECUTION |
| | ActionTiming.immediately | NONE | DESIGNATE IMMEDIATE EXECUTION FOR PROCESS |
| Get | Printer List | NONE | OBTAIN A PRINTER LIST |
| | PrinterInformation.status | NONE | OBTAIN A PRINTER INTERNAL STATUS |
| | PrinterInformation.Log | NONE | OBTAIN PRINTER INTERNAL LOG |
| | PrinterInformation.Rev | NONE | OBTAIN THE VERSION NUMBER OF THE PRINTER FIRMWARE |
| | Test Result | NONE | OBTAIN THE TEST RESULT |
| Test | Connection | NONE | CONDUCT THE NETWORK CONNECTION TEST |
| | Mechanism | NONE | CONDUCT THE MECHANISM SYSTEM TEST |
| | Controller | NONE | CONDUCT THE CONTROL SYSTEM TEST |
| | All Item | NONE | CONDUCT THE ALL ITEM TEST ( NETWORK /MECHANISM/ CONTROLLER ) |

FIG. 42B

COMMAND STATEMENT EXAMPLES
    <Set>Response,Route.Mail.Address(＊＊＊＊@＊＊.＊＊.co.jp)  [REPORT THE PROCESS RESULT BY EMAIL]
    <Set>Target,Printer.Ip(＊＊＊.＊＊.＊＊.＊＊)  [DESIGNATE A PRINTER BY THE IP ADDRESS]
    <Set>ActionTiming.Immediately  [ IMMEDIATE EXECUTION]
    <Test>All Item  [TEST ALL ITEMS]
    <Get>Test Result  [TRANSMIT THE TEST RESULT]

PERIPHERAL EQUIPMENT MANAGEMENT DEVICE, A PERIPHERAL DEVICE CONNECTED TO A PERIPHERAL MANAGEMENT DEVICE, AND A METHOD OF THE SAME OF EXECUTING A PROCESS IN ACCORDANCE WITH A PROCESS SCHEDULE GENERATED ON THE BASIS OF INFORMATION SENT FROM A DEVICE AND TRANSMITTING A RESULT TO A MONITORING DEVICE

BACKGROUND OF THE INVENTION

1. Field of the Invention

The present invention generally relates to a peripheral equipment management device and method, and more specifically, to a peripheral equipment management device and method which integrally manage peripheral equipment connected to a network.

2. Description of the Related Art

In recent years, systems in which printers are connected to a network and shared by information processing devices connected to the network have been developed. Printers are normally maintained by service engineers who actually visit their customers. In a system operation, the maintenance and management are troublesome and time-consuming. In view of this, there has been an increasing demand for a system which makes the maintenance and management easier.

A printer manufacturer conducts two types of maintenance: one is regular maintenance, and the other is corrective maintenance.

For the regular maintenance, a service engineer visits end users at uniform intervals (several weeks or several months). The service engineer checks the conditions of printers, replaces worn components with new ones, and cleans the printers. If there is no problem, the service engineer only checks the conditions of the printers.

In a case of the corrective maintenance, the user of the printer reports the occurrence of trouble to the manufacturer, and a service engineer of the manufacturer visits the user. This requires energy and time, and makes it difficult to constantly maintain and manage the conditions of the printer.

Also, a maintenance operation involves checking the condition of a printer, setting the printer, and updating firmware, as well as replacing worn components and cleaning. In a case of a maintenance operation not involving component replacement and cleaning, the maintenance operation is carried out using the operation panel of the printer or a maintenance tool installed in a personal computer. To set the printer, for instance, the service engineer has to stand in front of the printer to carry out the setting with the operation panel, or transmit commands from a personal computer near the printer. To update the firmware, the service engineer has to bring a medium such as a floppy disk, and insert the floppy disk into a floppy disk drive built in the printer so as to load the firmware. These operations might be simple, but if there are many printers to be maintained, the maintenance operation becomes time consuming, and service engineers are more liable to make mistakes.

FIG. 1 is a flowchart of a process of conventional peripheral equipment maintenance management. In the work operation and maintenance, a routine operation is repeated (steps S1-11 to S1-1n) before a regular maintenance operation is performed (step S1-2). Intervals between the regular maintenance operations in step S1-2 vary depending on the machine type and contract type. The regular maintenance by the manufacturer is conducted at regular intervals. The service engineer checks the conditions of the components of the printer, cleans the printer, and replaces the components with new ones if necessary.

FIG. 2 is a flowchart of a routine operation of an example of maintenance and management of conventional peripheral equipment. In a routine operation (step S2-1), if trouble is caused in the printer (step 2-2), the end user first handles the trouble (step S2-3). If the end user cannot eliminate the trouble or trouble is repeatedly caused after the repair (step S2-4), the management section is asked to handle the trouble (step S2-5). If the trouble can be eliminated in the management section, the trouble is handled in the management section (steps S2-6 and 2-7). If the trouble cannot be handled in the management section, the manufacturer is asked to handle the trouble, and the trouble is eliminated (steps S2-8 and S2-9).

Normally, a service engineer visits end users after the business hours or late at night, so as not to stop users' business operations. However, this greatly limits the places and times for maintenance, and stresses service engineers both physically and mentally. Also, the travelling expenses and overtime work pay for service engineers result in an increase of the maintenance costs.

When trouble is caused, users have to eliminate the trouble by themselves. If the trouble cannot be eliminated, the users ask the system management section or the manufacturer to handle the trouble. By the time the manufacturer is asked to handle the trouble, a considerable time has already passed since the occurrence of the trouble, and it is often difficult to inform the manufacturer of accurate information on the trouble. Also, an immediate solution is often required, which makes handling the trouble even more difficult.

SUMMARY OF THE INVENTION

A general object of the present invention is to provide a peripheral equipment management device, peripheral equipment connected to the same, and a peripheral equipment management method, in which the above disadvantages are eliminated.

A more specific object of the present invention is to provide a peripheral equipment management device which can easily and flexibly manage peripheral equipment, peripheral equipment connected to the peripheral equipment management device, and a peripheral equipment management method.

The above objects are achieved by a peripheral equipment management device which is connected between peripheral equipment and a monitoring device for monitoring the conditions of the peripheral equipment, and manages the conditions of the peripheral equipment. This peripheral equipment management device includes a process execution unit which carries out a desired process for the peripheral equipment, and a transmission unit which transmits the result of the process carried out to the monitoring device.

This peripheral equipment management device also includes an execution process setting unit which designates the process to be carried out for the peripheral equipment. The peripheral equipment management device further includes a time setting unit which sets a time for the process execution unit to carry out the process for the peripheral equipment. The peripheral equipment management device also includes a peripheral equipment selecting unit which selects the peripheral equipment for which the process is carried out by the process execution unit. The peripheral equipment management device further includes a transmission destination selecting unit which selects the monitoring device to which the transmission unit transmits the result of the process carried out by the process execution unit. The peripheral equipment management device also includes a process result storage unit which stores the result of the process carried out by the process execution unit.

According to the present invention, printer devices can be always monitored without a serviceman being there, and signs of trouble can be found before it causes permanent damage. If there is trouble caused in a printer, the information is immediately and accurately obtained so that the trouble can be quickly eliminated. Also, as the travelling expenses and overtime work of service engineers can be reduced, the maintenance costs can also be lowered.

The above and other objects and features of the present invention will become more apparent from the following description taken in conjunction with the accompanying drawings.

BRIEF DESCRIPTION OF THE DRAWINGS

FIG. 19 shows the data structure of an internal information table of the printer of the present invention;

FIG. 20 shows the data structure of a printer setting table of the printer of the present invention;

FIG. 27A shows the data structure of a time table of the present invention;

FIG. 27B shows the data structure of a process table of the present invention;

FIG. 29 shows control codes and process codes set in the process schedule stack of the present invention;

FIG. 39A shows printer filtering tables used in filtering processes of the present invention;

FIG. 39B shows a filtering process table used in a filtering process of the present invention;

FIGS. 42A and 42B show process requests made through electronic mail in the present invention;

DESCRIPTION OF THE PREFERRED EMBODIMENTS

The following is a description of embodiments of the present invention, with reference to the accompanying drawings.

Figure 1:
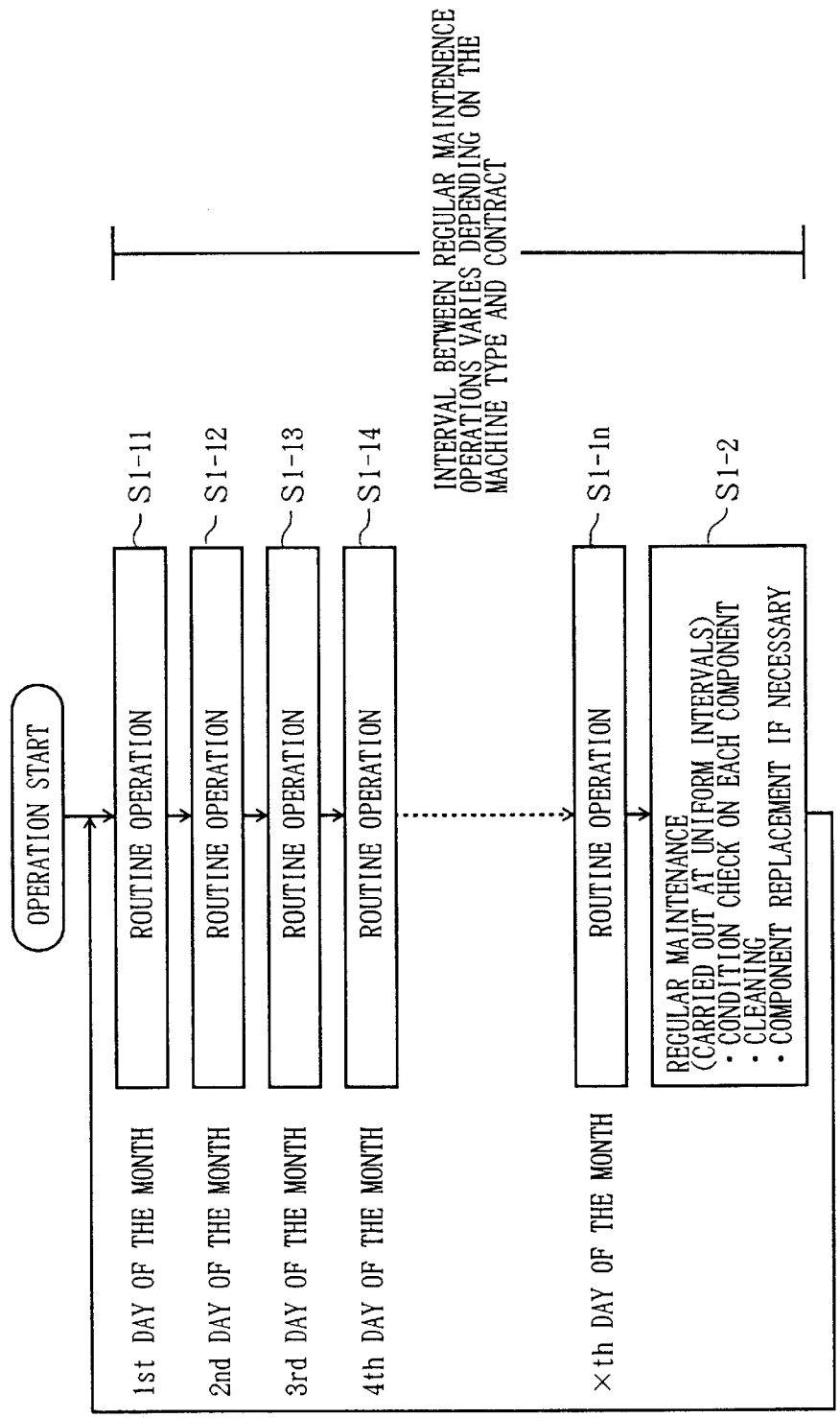
FIG. 1 is a flowchart of a maintenance and management operation of conventional peripheral equipment.
Figure 2:
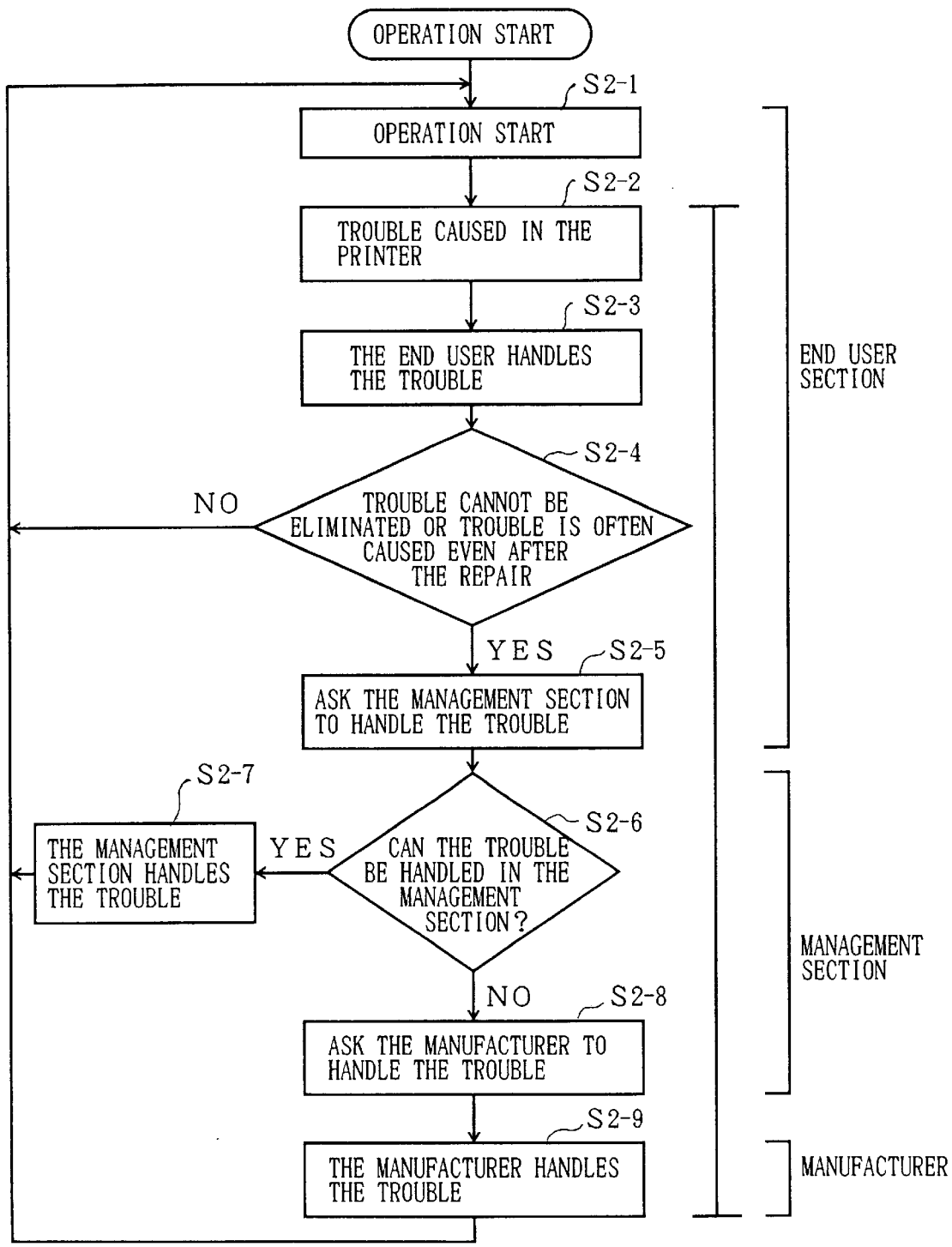
FIG. 2 is a flowchart of a routine maintenance and management operation of conventional peripheral equipment.
Figure 3:
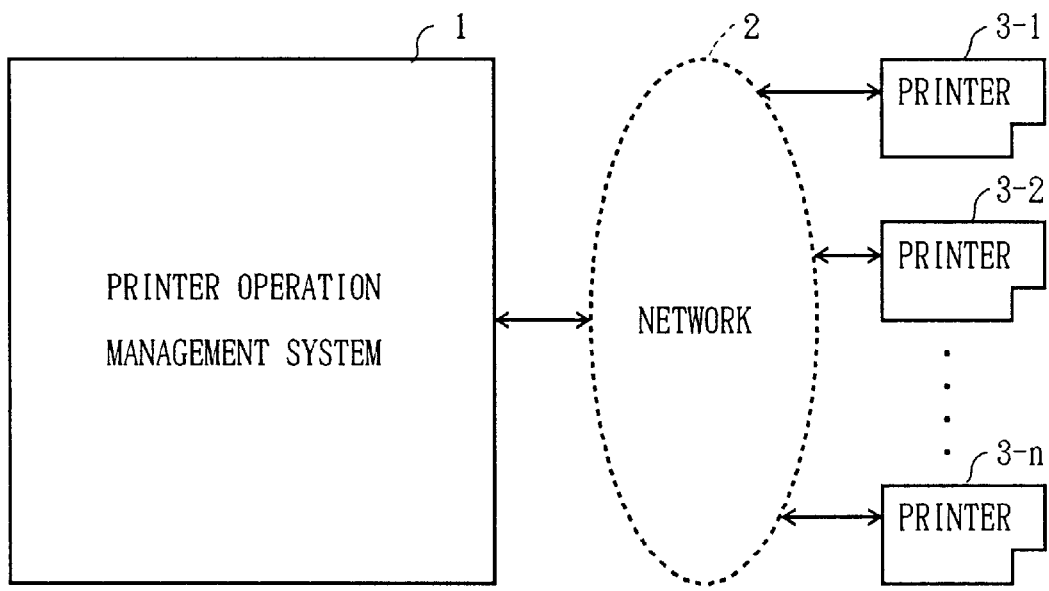
FIG. 3 is a schematic view of a system structure of the present invention.

FIG. 3 shows a system structure of one embodiment of the present invention. In this embodiment, a printer operation management system is employed as a peripheral equipment management system.

A printer operation management system 1 of this embodiment is connected, via a network 2, to printers 3-1 to 3-n shared by computers also connected to the network 2. Thus, the printers 3-1 to 3-n are managed and operated through the network 2.

Figure 4:
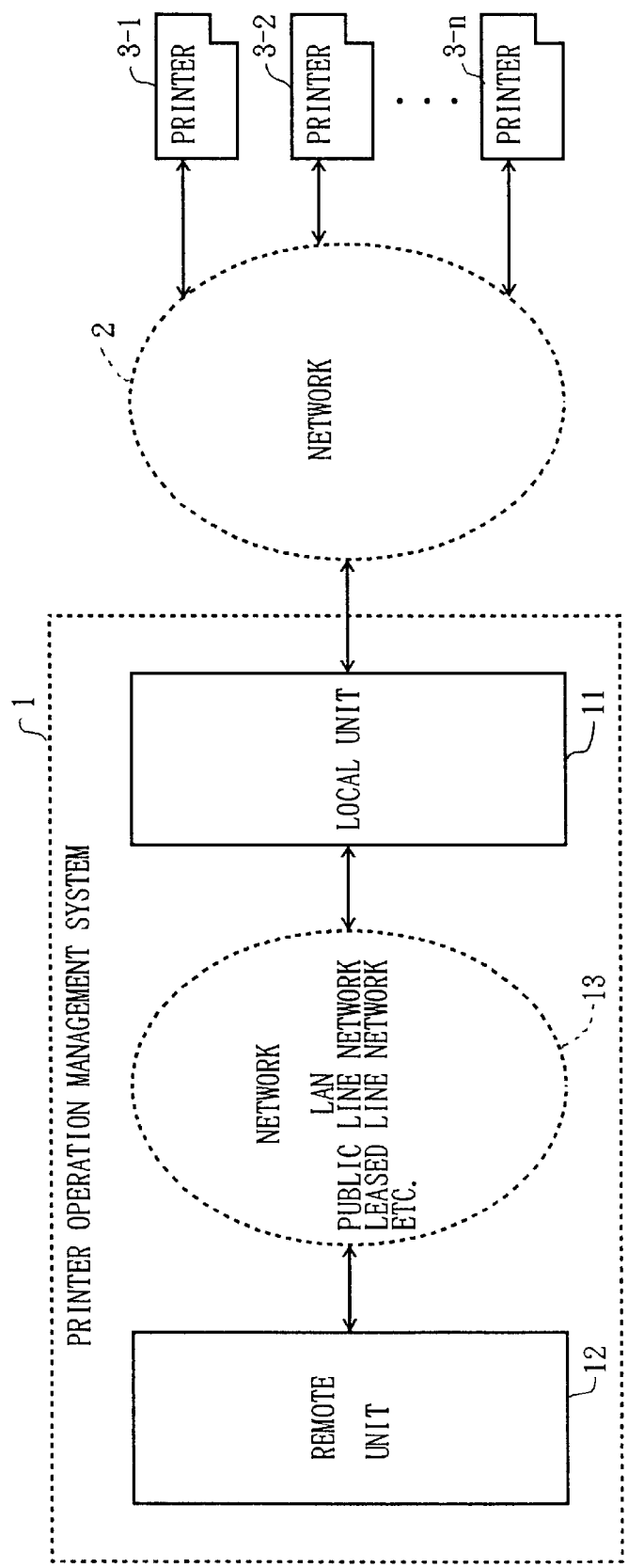
FIG. 4 is a schematic view of the structure of a printer device operation and management system of the present invention.

FIG. 4 shows the printer operation management system of the embodiment of the present invention. The printer operation management system 1 comprises a local unit 11 and a remote unit 12. The local unit 11 is connected to the printers 3-1 to 3-n via the network 2 so as to monitor the conditions of the printers 3-1 to 3-n and send monitor data to the remote unit 12 via a network 13. The remote unit 12 is connected to the local unit 11 via the network 13, and receives the monitor data of the printers 3-1 to 3-n sent from the local unit 11 via the network 13. The remote unit 12 also operates the printers 3-1 to 3-n via the network 2, the network 13, and the local unit 11, in accordance with the conditions of the printers 3-1 to 3-n.

Figure 5:
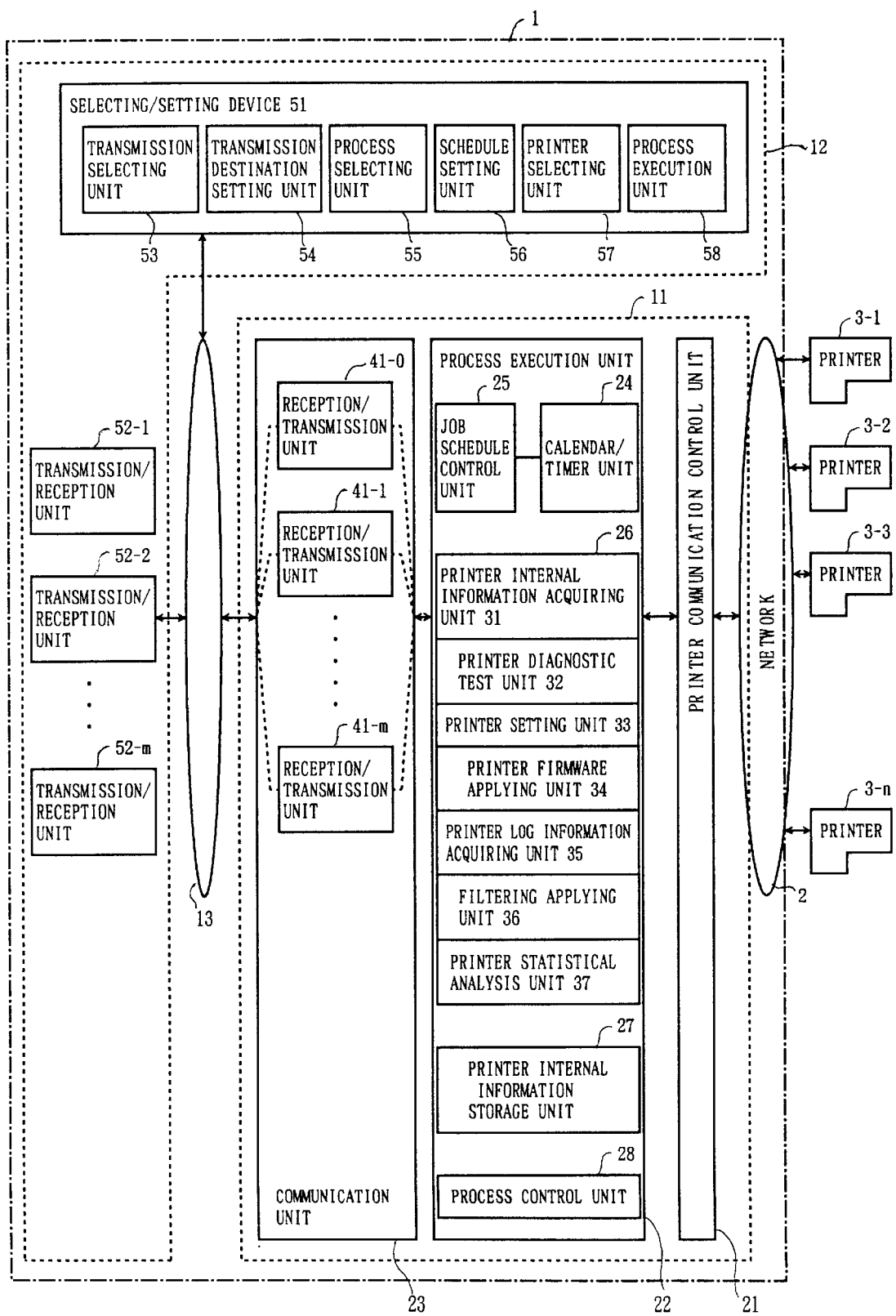
FIG. 5 is a block diagram of the printer device operation and management system of the present invention.

FIG. 5 is a block diagram of the printer operation management system of the embodiment of the present invention. The local unit 11 comprises a printer communication control unit 21, a process execution unit 22, and a communication unit 23. The printer communication control unit 21 is connected between the process execution unit 22 and the network 2, and communicates with the printers 3-1 to 3-n via the network 2. The process execution unit 22 comprises a calendar timer unit 24, a job schedule control unit 25, a processing unit 26, a printer internal information storage unit 27, and a process control unit 28. The calendar timer unit 24 clocks the current time. Referring to the calendar timer unit 24, the job schedule control unit 25 controls executions in the processing unit 26 in accordance with a predetermined schedule. The processing unit 26 carries out various processes in accordance with the schedule predetermined in the job schedule control unit 25. The printer internal information storage unit 27 stores printer internal information obtained from the printers 3-1 to 3-n through the processes carried out by the processing unit 26. The process control unit 28 controls transmission of various kinds of information obtained through the processes carried out by the processing unit 26.

The processing unit 26 comprises a printer internal information acquiring unit 31, a printer diagnostic test unit 32, a printer setting unit 33, a printer firmware applying unit 34, a printer log information acquiring unit 35, a filtering applying unit 36, and a printer statistical analysis unit 37. The printer internal information acquiring unit 31 acquires internal information indicating the conditions of the printers 3-1 to 3-n.

Figure 6:
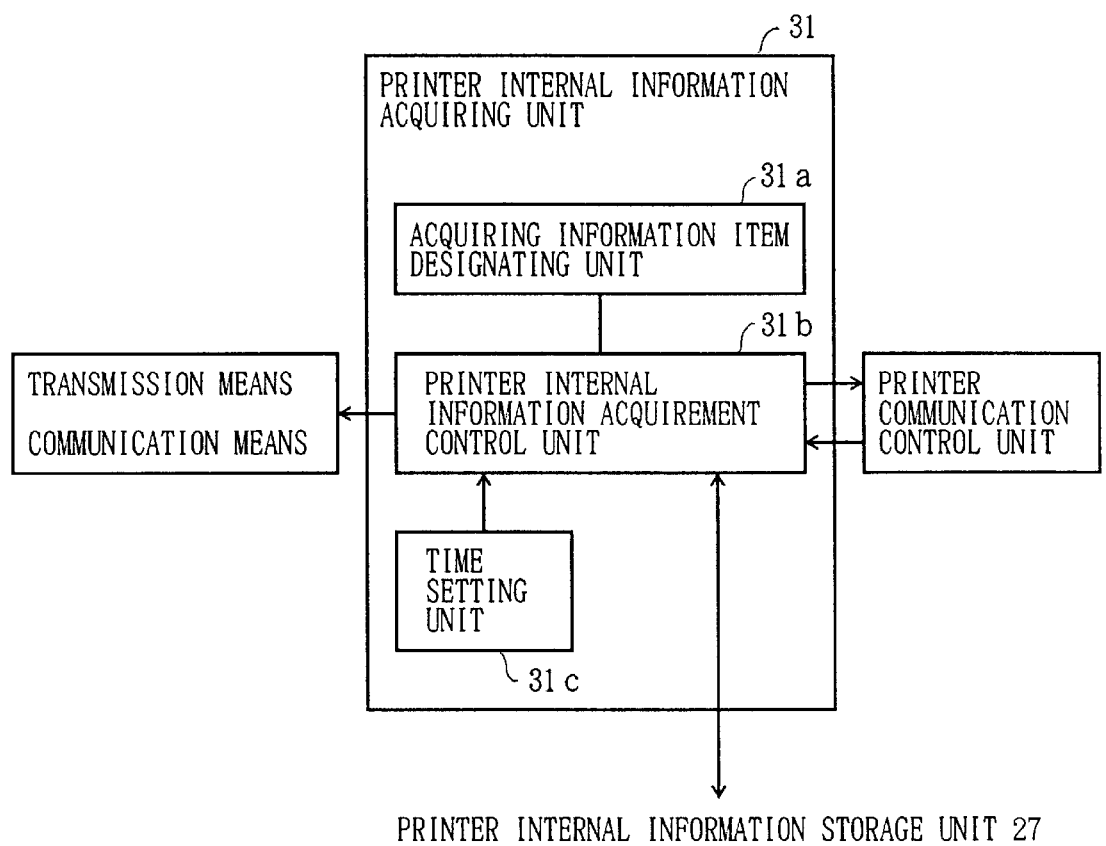
FIG. 6 is a block of a printer internal information acquiring unit of the present invention.

FIG. 6 is a block diagram of the printer internal information acquiring unit 31. The printer internal information acquiring unit 31 comprises an acquiring information item designating unit 31a, a printer internal information acquirement control unit 31b, and a time setting unit 31c.

Internal information items to be acquired from the printers 3-1 to 3-n are set in the acquiring information item specifying unit 31a in advance, so that the acquired information item designating unit 31a informs the printer internal information acquirement control unit 31b of the internal information items to be acquired from the printers 3-1 to 3-n.

The printer internal information acquirement control unit 31b gives a command to the printers 3-1 to 3-n to obtain the internal information designated by the acquiring information item designating unit 31a at intervals set in the time setting unit 31c. The printer internal information acquirement control unit 31b then sends the acquired printer internal information designated by the acquiring information item designating unit 31a to the printer internal information storage unit 27.

The intervals, at which the printer internal information is obtained by accessing the printers 3-1 to 3-n, are set in the time setting unit 31c. The time setting unit 31c informs the printer internal information acquirement control unit 31b of the timing for acquiring the printer internal information.

Figure 7:
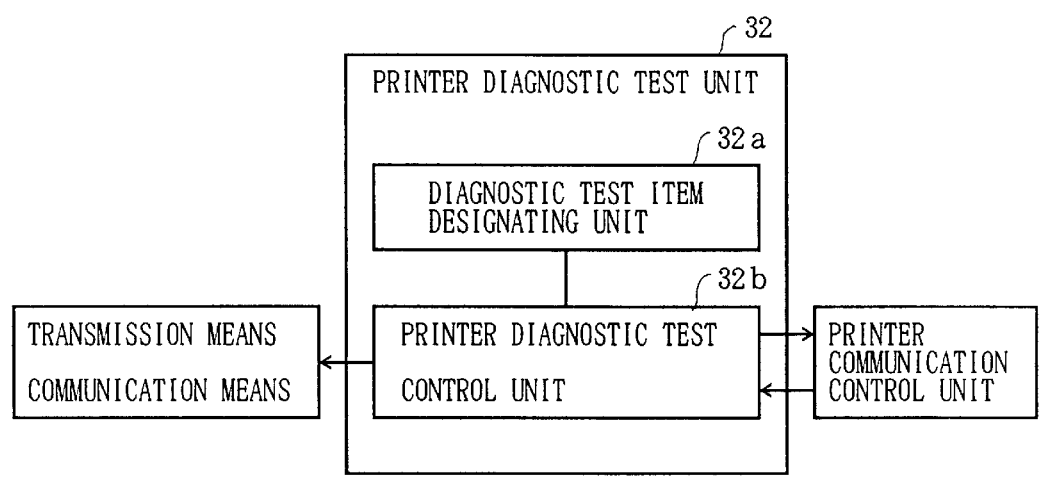
FIG. 7 is a block diagram of a diagnostic test unit of the present invention.

FIG. 7 is a block diagram of the printer diagnostic test unit 32 of this embodiment. The printer diagnostic test unit 32 examines the printers 3-1 to 3-n, and comprises a diagnostic test item designating unit 32a and a printer diagnostic test control unit 32b.

The diagnostic test item designating unit 32a informs the printer diagnostic test control unit 32b of items on which the printers 3-1 to 3-n should be examined. The printer diagnostic test control unit 32b gives a command to the printers 3-1 to 3-n to carry out the diagnosis in accordance with the instructions from the diagnostic test item designation unit 32a. The printer diagnostic test control unit 32b also sends the diagnosis results obtained from the printers 3-1 to 3-n to the remote unit 12.

Figure 8:
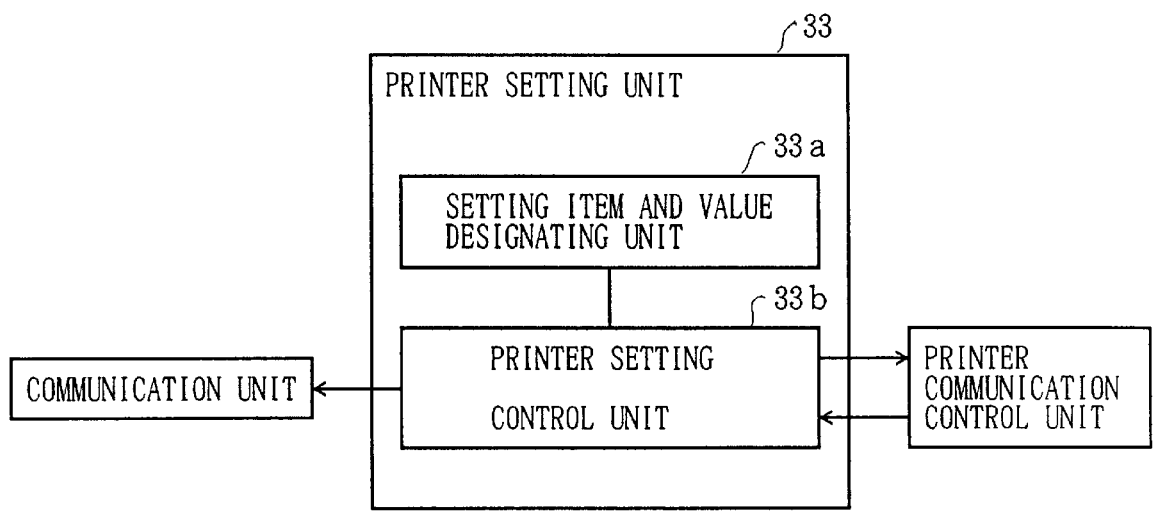
FIG. 8 is a block diagram of a printer setting unit of the present invention.

FIG. 8 is a block diagram of the printer setting unit 33 shown in FIG. 5. The printer setting unit 33 designates setting items and setting values for the printers 3-1 to 3-n. The printer setting unit 33 is made up of a setting item and value designating unit 33a and a printer setting control unit 33b.

The setting item and value designating unit 33a informs the printer setting control unit 33b of the setting items and setting values for the printers 3-1 to 3-n. The setting items can be set independently of each other, or can be collectively set.

The printer setting control unit 33b sets the setting items and the values in the printers 3-1 to 3-n designated by the printer setting item and value designating unit 33a, and sends the set contents to the remote unit 12 via the communication unit 23.

Figure 9:
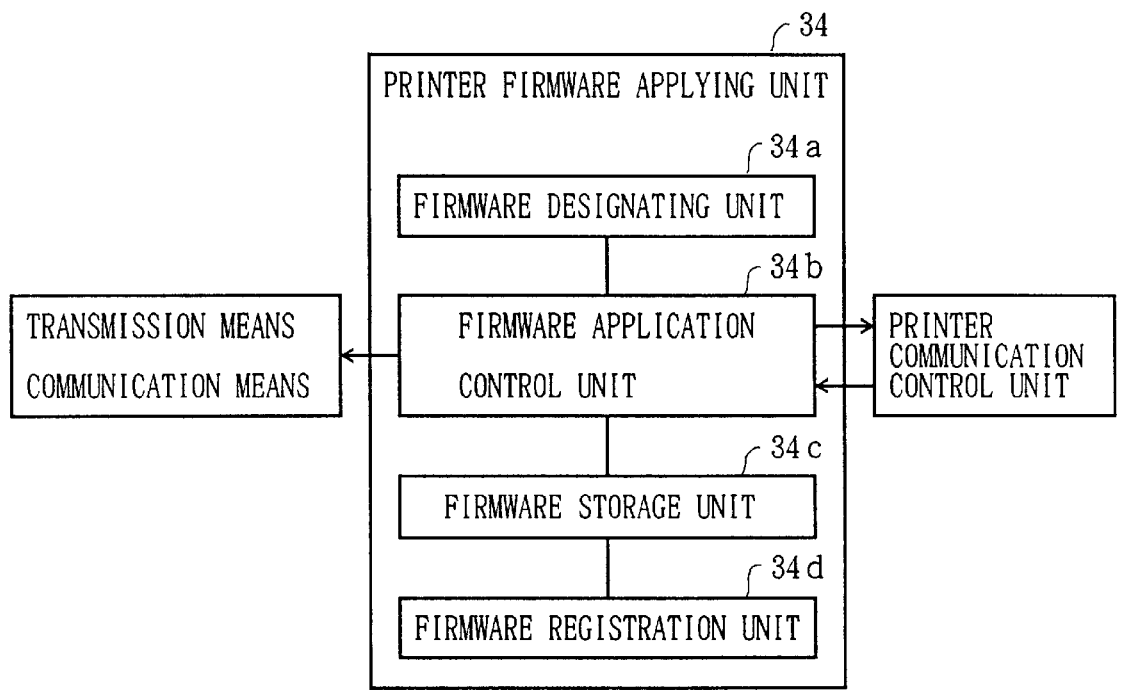
FIG. 9 is a block diagram of a printer firmware applying unit of the present invention.

FIG. 9 is a block diagram of the printer firmware applying unit 34 shown in FIG. 5. The printer firmware applying unit 34 sets firmware to be applied to the printers 3-1 to 3-n, and comprises a firmware designating unit 34a, a firmware application control unit 34b, a firmware storage unit 34c, and a firmware registration unit 34d.

The firmware-designating unit 34a informs the firmware application control unit 34b of the types and versions of the firmware to be applied to the printers 3-1 to 3-n.

The firmware storage unit 34c stores the firmware to be applied to the printers 3-1 to 3-n, and the firmware stored in the firmware storage unit 34c is managed in accordance with the type and version. The firmware registration unit 34d registers the firmware in the firmware storage unit 34c. The types and versions of the firmware registered at the time of registering in the firmware registration unit 34d are also registered in the firmware storage unit 34c.

The firmware application control unit 34b reads the firmware of the type and version designated by the firmware designating unit 34a out of the firmware storage unit 34c, and then sends the firmware to the designated printer among the printers 3-1 to 3-n.

Figure 10:
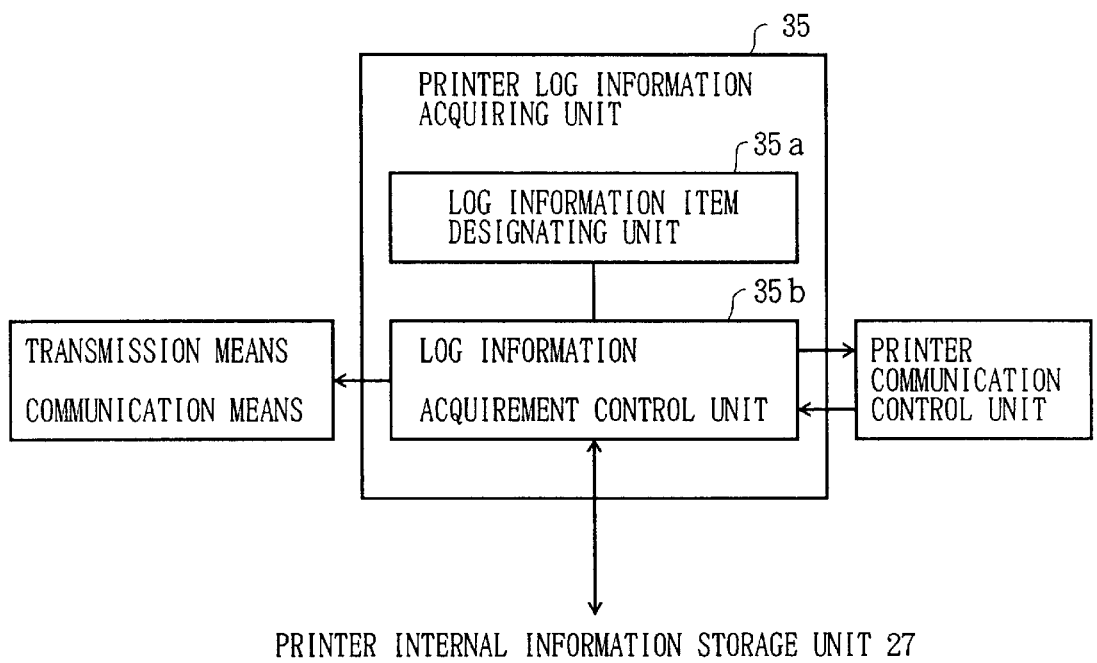
FIG. 10 is a block diagram of a log information acquiring unit of the present invention.

FIG. 10 is a block diagram of the printer log information acquiring unit 35 of this embodiment. The printer log information acquiring unit 35 sends the printer log information of each printer obtained as the printer internal information by the printer internal information acquiring unit 31 to the remote unit 12. The printer log information acquiring unit 35 comprises a log information item designating unit 35a and a log information acquirement control unit 35b.

The log information item designating unit 35a designates log information items to be obtained from the printer internal information storage unit 27 and sent to the remote unit 12. The log information items include error log information and consumables management counter log information, for instance. The log information items are acquired as the printer internal information by the printer internal information acquiring unit 31, and stored in the printer internal information storage unit 27.

The log information acquirement control unit 35b reads the log information of the item designated by the log information item designating unit 35a from the log information stored in the printer internal information storage unit 27, and sends the log information to the remote unit 12 via the communication unit 23.

Figure 11:
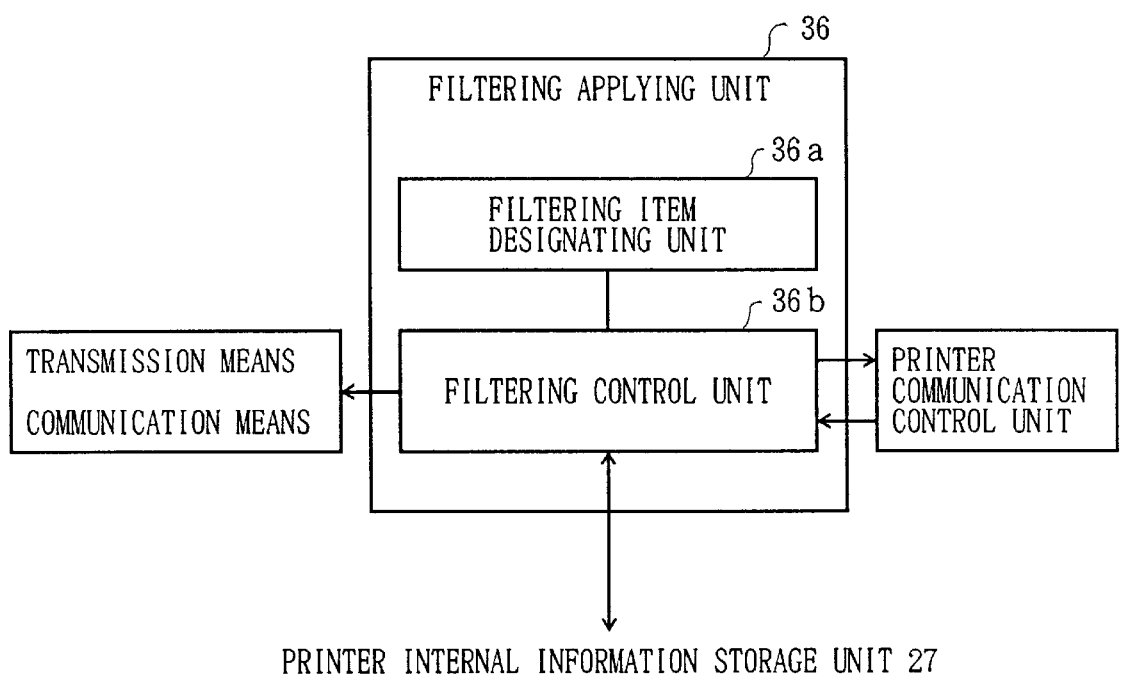
FIG. 11 is a block diagram of a filtering applying unit of the present invention.

FIG. 11 is a block diagram of the filtering applying unit 36 shown in FIG. 5. The filtering applying unit 36 filters the printer internal information in accordance with predetermined filtering conditions, and sends the filtered printer internal information to the remote unit 12. The filtering applying unit 36 comprises a filtering item designating unit 36a and a filtering control unit 36b.

The filtering item designating unit 36a designates filtering conditions. The filtering conditions include "a paper jam occurs 10 times within one hour", for instance. It is also possible to prepare several general conditions such as "a - - - error occurs - - - times within - - - hours" in the filtering item designating unit 36a, and change the parameters "- - - " as necessary.

The filtering control unit 36b searches the printer internal information stored in the printer internal information storage unit 27. When the printer internal information satisfying the filtering condition designated by the filtering item designating unit 36a is detected, the filtering condition designated by the filtering item designating unit 36a is sent to the remote unit 12 via the communication unit 23.

Figure 12:
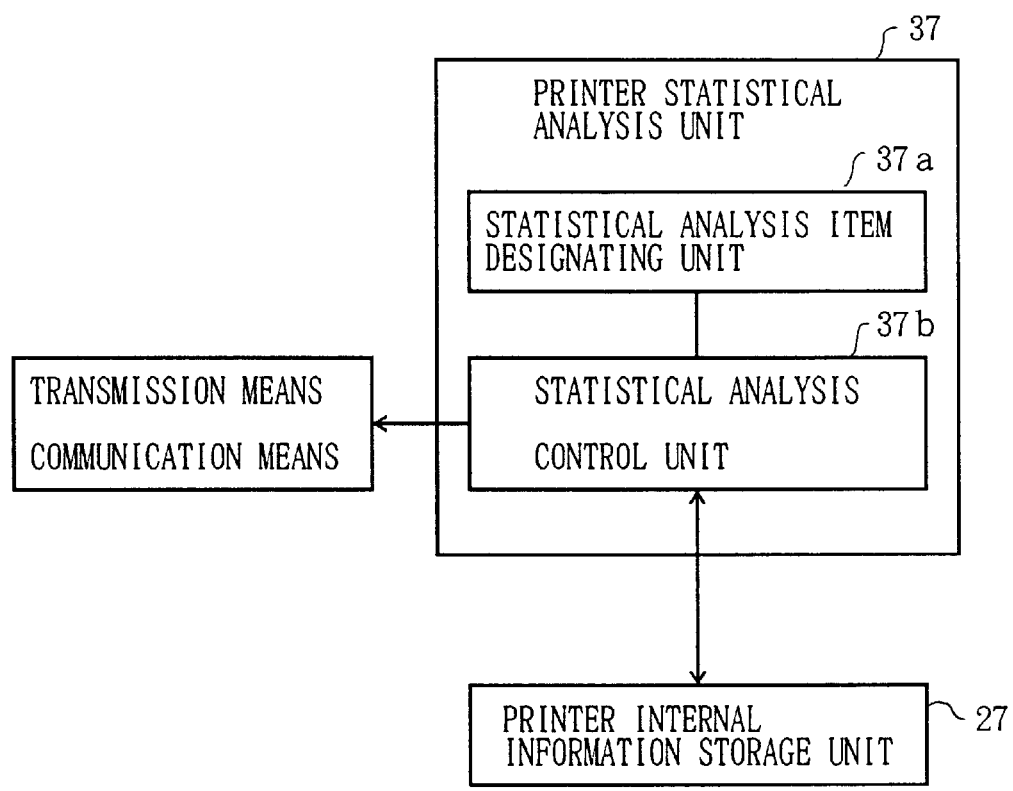
FIG. 12 is a block diagram of a printer statistical analysis unit of the present invention.

FIG. 12 is a block diagram of the printer statistical analysis unit 37 shown in FIG. 5. The printer statistical analysis unit 37 statistically analyzes the printer internal information in accordance with designated statistical analysis items, and sends the results to the remote unit 12. The printer statistical analysis unit 37 comprises a statistical analysis item designating unit 37a and a statistical analysis control unit 37b.

The statistical analysis item designating unit 37a designates statistical analysis items and periods. The statistical analysis items include "the number of error occurrences in a day" and "a change of the wear rate of consumables", for instance. The statistical analysis item designating unit 37a can also designate the period of time for statistical analysis.

The statistical analysis control unit 37b reads out necessary information from the printer internal information stored in the printer internal information storage unit 27 in accordance with the statistical analysis items and periods designated by the statistical analysis item designating unit 37a. The statistical analysis control unit 37b then carries out the designated statistical analysis and sends the results to the remote unit 12. A more specific example of the statistical analysis will be described below.

Figure 13:
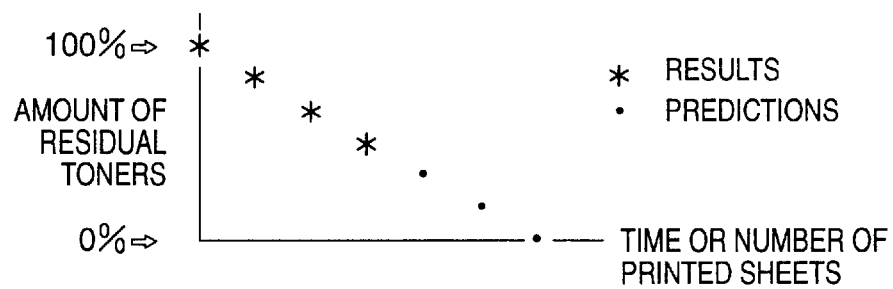
FIG. 13 shows a statistical analysis of residual toner of the present invention.

FIG. 13 illustrates a statistical analysis of the amount of residual toner. In this figure, the residual toner amount information among the printer internal information stored in the printer internal information storage unit 27 is indicated by "*" in a time series, so that the amount of residual toner can be predicted as indicated by "·". Accordingly, it is also possible to predict the time when there will be no toner left.

Figure 14:
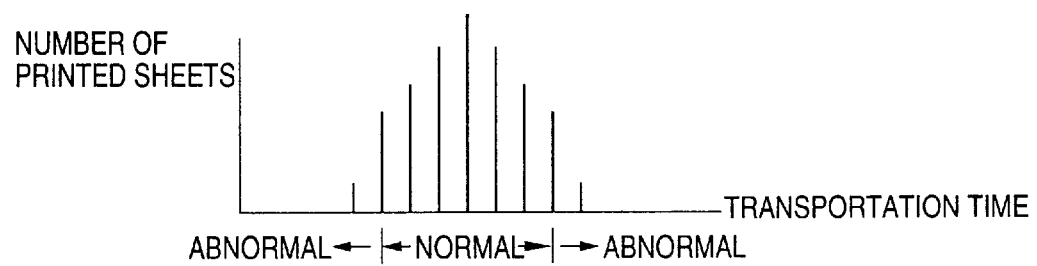
FIG. 14 shows a statistical analysis of a disorder in a transportation system of the present invention.

FIG. 14 illustrates a statistical analysis of the transportation system of this embodiment. The statistical analysis of the transportation system is made based on the distribution of the numbers of printed sheets in uniform transportation periods of time. The distribution of the numbers of printed sheets shown in FIG. 14 is obtained from the printer internal information stored in the printer internal information storage unit 27 by counting the numbers of printed sheets in the uniform transportation periods of time. Here, if the transportation time is within a predetermined range, it is judged to be in a normal operation, but if the transportation time is too short or too long, it is judged to be in an abnormal operation.

Figure 15:
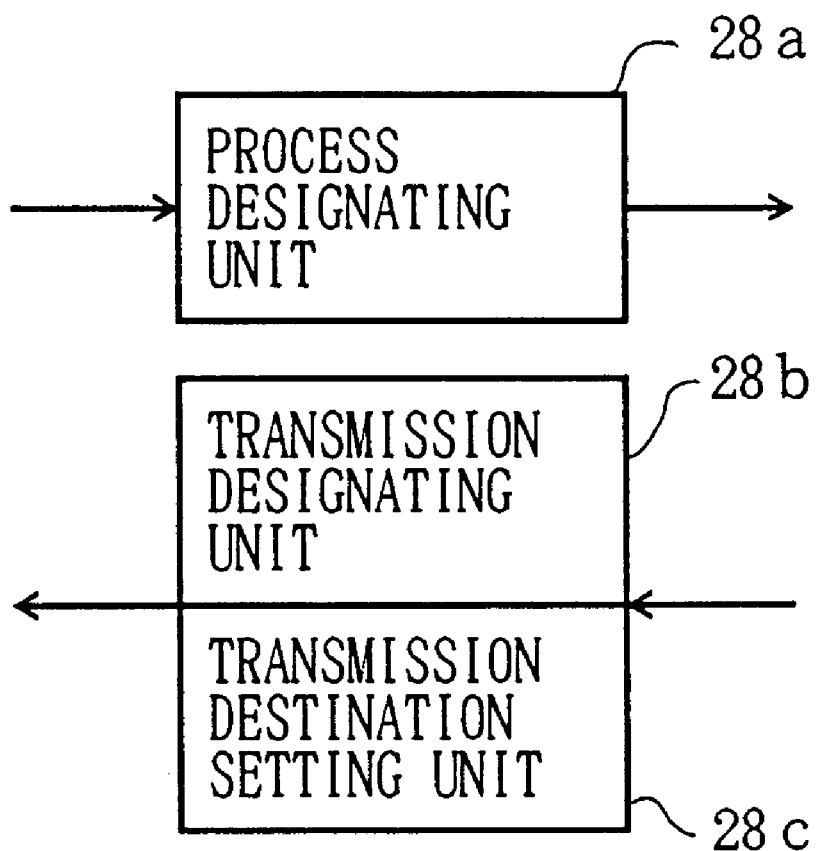
FIG. 15 is a block diagram of a process control unit of the present invention.

FIG. 15 is a block diagram of the process control unit 28 shown in FIG. 5. The process control unit 28 controls the processing unit 26, and comprises a process designating unit 28a, a transmission designating unit 28b, and a transmission destination setting unit 28c.

The process designating unit 28a designates a process to be carried out by the processing unit 26 in accordance with instructions from the remote unit 12. The transmission designating unit 28b designates a transmission means for sending the results of the processing unit 26 to the remote unit 12. The transmission destination setting unit 28c designates a destination in the remote unit 12 to which the results from the processing unit 26 are to be sent.

The communication unit 23 shown in FIG. 5 comprises (m+1) of reception/transmission units 41-0 to 41-m corresponding to (m+1) of communication destinations. The reception/transmission units 41-0 to 41-m receive various kinds of information for designating a process from the remote unit 12, and transmit the results from the process execution unit 22 to the remote unit 12.

Figure 16:
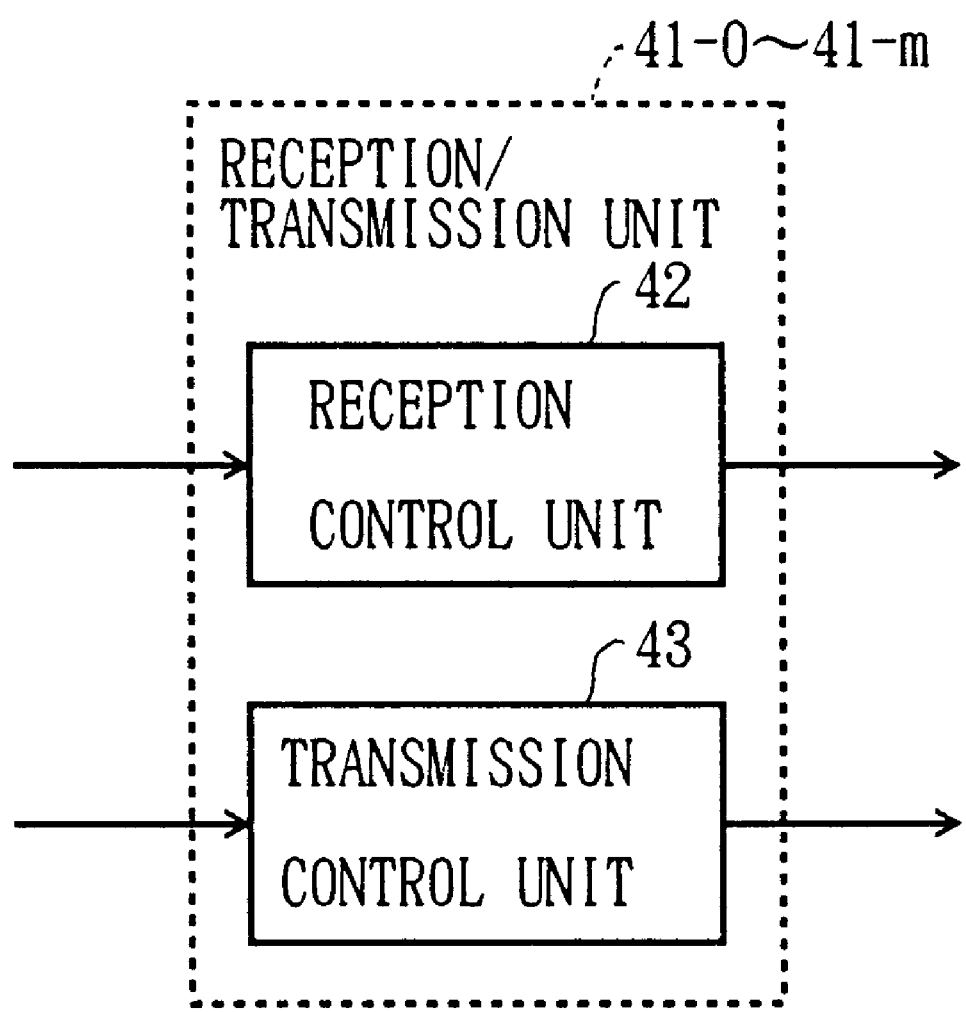
FIG. 16 is a block diagram of a reception/transmission unit of the present invention.

FIG. 16 is a block diagram of the reception/transmission units 41-0 to 41-m. Each of the reception/transmission units 41-0 to 41-m comprises a reception control unit 42 and a transmission control unit 43. The reception control unit 42 receives information from the remote unit 12, and sends the information to the process execution unit 22. The transmission control unit 43 transmits the results of the process execution unit 22 to the remote unit 12 via the network 13.

The remote unit 12 comprises a selecting/setting device 51 and transmission/reception devices 52-1 to 52-m. The selecting/setting device 51 comprises a transmission selecting unit 53, a transmission destination setting unit 54, a process selecting unit 55, a schedule setting unit 56, a printer selecting unit 57, and a process execution unit 58.

The transmission selecting unit 53 selects a transmission means for transmitting the result of the process carried out by the process execution unit 22 of the local unit 11. The information of the transmission means selected by the transmission selecting unit 53 is transmitted to the local unit 11 via the network 13, and is set in the transmission designating unit 28b of the process control unit 28.

The transmission destination setting unit 54 sets a destination to which the result of the process carried out by the process execution unit 22 of the local unit 11 is transmitted. The transmission destination set by the transmission destination setting unit 54 is transmitted to the local unit 11 via the network 13, and is set in the transmission destination setting unit 28c of the process control unit 28.

The process selecting unit 55 selects a desired process from the printer internal information acquiring unit 31, the printer diagnostic test unit 32, the printer setting unit 33, the printer firmware applying unit 34, the printer log information acquiring unit 35, the filtering applying unit 36, and the printer statistical analysis unit 37. The selected process by the process selecting unit 55 is then set in the process designating unit 28a of the local unit 11.

The schedule setting unit 56 sets a schedule for a process to be carried out by the processing unit 26. The schedule set by the schedule setting unit 56 is transmitted to the local unit 11 via the network 13, and is set in the job schedule control unit 25 of the process execution unit 22.

The printer selecting unit 57 selects a printer for carrying out a process to be carried out by the process execution unit 22. The printer selected by the printer selecting unit 57 is transmitted to the processing unit 26 of the local unit 11 to designate the printer.

The process execution unit 58 orders the process execution unit 22 to carry out a process in accordance with the setting in the transmission selecting unit 53, the transmission setting unit 54, the process selecting unit 55, the schedule setting unit 56, and the printer selecting unit 57.

The selecting/setting device 51 can be a display terminal, a mail client device, a telephone machine, or a facsimile machine.

Figure 17:
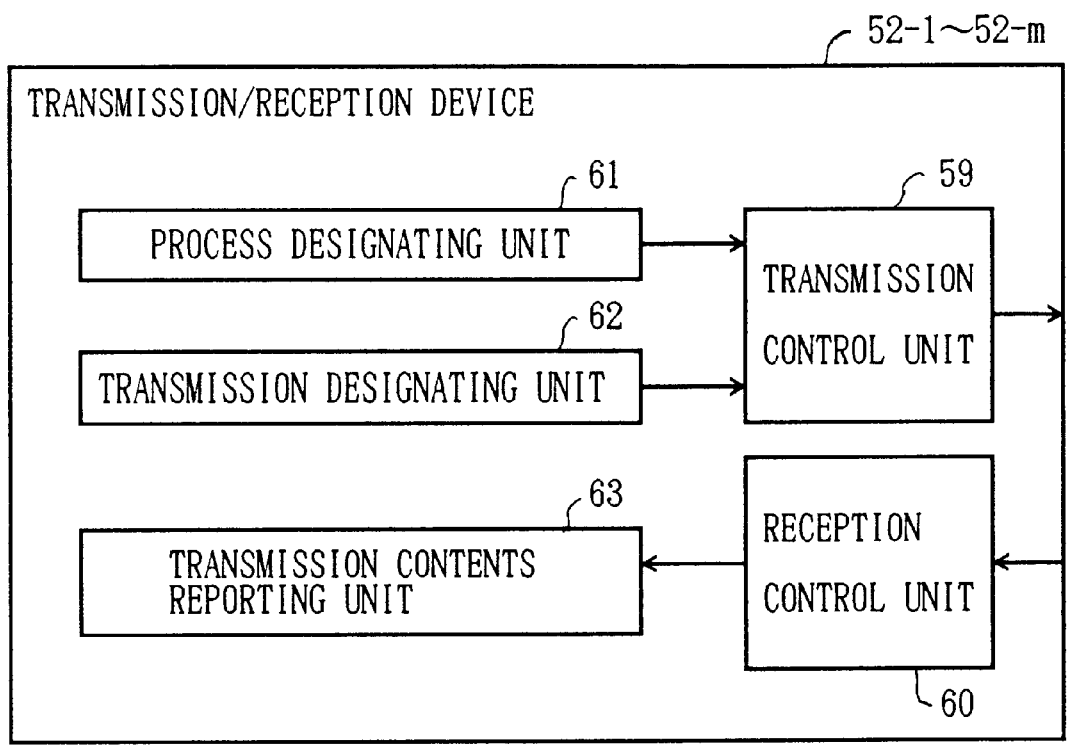
FIG. 17 is a block diagram of a transmission/reception device in a remote unit of the present invention.

FIG. 17 is a block diagram of the transmission/reception devices 52-1 to 52-m of the remote unit 12. The transmission/reception devices 52-1 to 52-m are situated in a remote area, and supervise the conditions of the printers 3-1 to 3-n. Each of the transmission/reception devices 52-1 to 52-m comprises a transmission control unit 59, a reception control unit 60, a process designating unit 61, a transmission designating unit 62, and a transmission contents reporting unit 63.

The transmission control unit 59 controls transmission to the local unit 11 via the network 13. The reception control unit 60 controls data reception from the local unit 11 via the network 13. The process designating unit 61 designated a process to be carried out by the process execution unit 22. The designation by the process designating unit 61 is reported to the transmission control unit 59 and the local unit 11 via the network 13. The transmission designating unit 62 designates a transmission destination and a transmission means for transmitting the result of the process designated by the process designating unit 61. The transmission destination and transmission means designated by the transmission designating unit 62 are reported to the transmission control unit 59 and the local unit 11 via the network 13. The transmission contents reporting unit 63 reports the printer internal information received by the reception control unit 60 from the local unit 11 to an operator.

Figure 18:
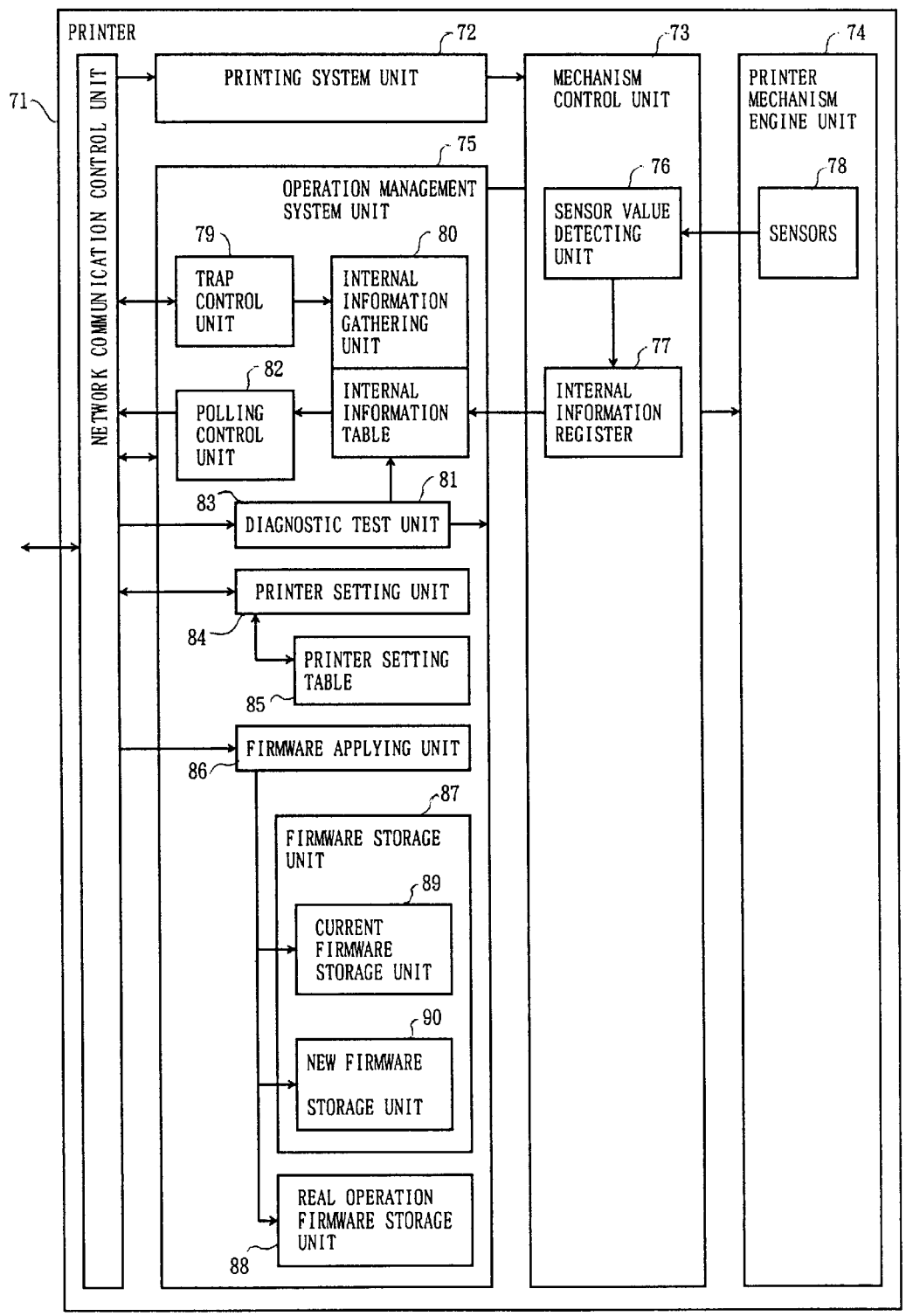
FIG. 18 is a block diagram of a printer of the present invention.

FIG. 18 is a block diagram of the printers 3-1 to 3-n shown in FIG. 5. Each of the printers 3-1 to 3-n comprises a network communication control unit 71, a printing system unit 72, a mechanism control unit 73, a printer mechanical engine unit 74, and an operation management system unit 75.

The network communication control unit 71 is connected to the network 2 so as to communicate with the local unit 11. The printing system unit 72 processes printing data sent through the network 2, and sends the processed printing data to the mechanism control unit 73.

The mechanism control unit 73 generates a mechanism control signal from the printing data processed by the printing system unit 72, and sends the mechanism control signal to the printer mechanism engine unit 74. The mechanism control unit 73 has a sensor value detector 76 and an internal information register 77. The sensor value detector 76 detects sensor values transmitted from the printer mechanism engine unit 74, and acquires the internal information corresponding to each of the sensor values. The internal information detected by the sensor value detector 76 is stored in the internal information register 77.

The printer mechanism engine unit 74 is driven in accordance with the mechanism control signal transmitted from the mechanism control unit 73. The printer mechanism engine unit 74 pulls in and transports printing sheets, and performs printing in accordance with the printing data. The printer mechanism engine unit 74 has various sensors 78. The various sensors 78 detect various operations necessary for printing, including a sensor for detecting a paper jam and a sensor for detecting the toner amount.

The operation management system unit 75 comprises a trap control unit 79, an internal information gathering unit 80, an internal information table 81, a polling control unit 82, a diagnostic test unit 83, a printer setting unit 84, a printer setting table 85, a firmware applying unit 86, a firmware storage unit 87, and a real operation firmware unit 88.

The trap control unit 79 immediately transmits the internal information gathered by the internal information gathering unit 80 from the internal information register 77 of the mechanism control unit 73 to the local unit 11 via the network communication control unit 71 and the network 2. The internal information gathering unit 80 gathers the internal information stored in the internal register 77 of the mechanism control unit 73.

FIG. 19 shows the data structure of the internal information table 81 shown in FIG. 18. The internal information table 81 stores the internal information gathered from the mechanism control unit 73. The internal information includes a sheet transportation time, the number of retried operations, a toner control sensor output value, a toner supply counter value, a developer life counter value, a drum life counter value, and various error information.

The polling control unit 82 transmits the contents of the internal information table 81 to the local unit 11 via the network communication control unit 71 and the network 2, in accordance with inquiry commands sent through the network 2 and the network communication control unit 71.

The diagnostic test unit 83 conducts tests in accordance with diagnostic commands supplied from the local unit 11 via the network 2 and the network communication control unit 71, and reports the results. The tests include a mechanic system test, a control system test, and a printing system test. In the mechanic system test, the components of the printer mechanism engine unit 74 are driven to check whether they operate normally from the detection results of the sensors 78. The checked results of the sensors 78 are reported to the local unit 11 that supplied the diagnostic commands.

In the control system test, test signals are transmitted to the printing system unit 72 and the mechanism control unit 73, and diagnosis is carried out in accordance with the replies from the printing system unit 72 and the mechanism control unit 73. For instance, results of a RAM read/write check and an input/output port check are sent back to the local unit 11.

In the printing system test, various test patterns are printed so that the printer internal information during the printing is transmitted in accordance with the sensors 78.

The printer setting unit 84 updates the printer setting table 85 in accordance with printer setting commands supplied from the local unit 11 via the network 2 and the network communication control unit 71. The printer setting table 85 stores printer setting information.

FIG. 20 show the data structure of the printer setting table 85 of FIG. 18. As shown in FIG. 20, the printer setting information stored in the printer setting table 85 includes types of emulation and setting information of various operation modes. In accordance with the printer setting information stored in the printer setting table 85, processes to be carried out in the printing system unit 72 are set.

The firmware applying unit 86 sends firmware supplied from the local unit 11 via the network 2 and the network communication control unit 71 to the firmware storage unit 87, and the firmware is stored in the firmware storage unit 87. The firmware storage unit 87 comprises a current firmware storage unit 89 and a new firmware storage unit 90. The current firmware storage unit 89 stores the currently applied firmware. The new firmware storage unit 90 new firmware supplied from the local unit 11.

When new firmware is supplied from the local unit 11 via the network 2 and the network communication control unit 71, the firmware applying unit 86 sends the new firmware to the new firmware storage unit 90 in the firmware storage unit 87. The firmware applying unit 86 then judges whether the new firmware is applicable to the printers from version/application information accompanying the new firmware. If the new firmware is judged to be applicable to the printers, the new firmware stored in the new firmware storage unit 90 is transferred to the current firmware storage unit 89. If the new firmware is judged to be inapplicable to the printers, the current firmware stored in the current firmware storage unit 89 is applied.

The real operation firmware storage unit 88 includes a RAM, and is loaded with the current firmware stored in the current firmware storage unit 89 when the power source is turned on or the current firmware is applied. The printing operation is controlled by the firmware sorted in the real operation firmware storage unit 88.

Figure 21:
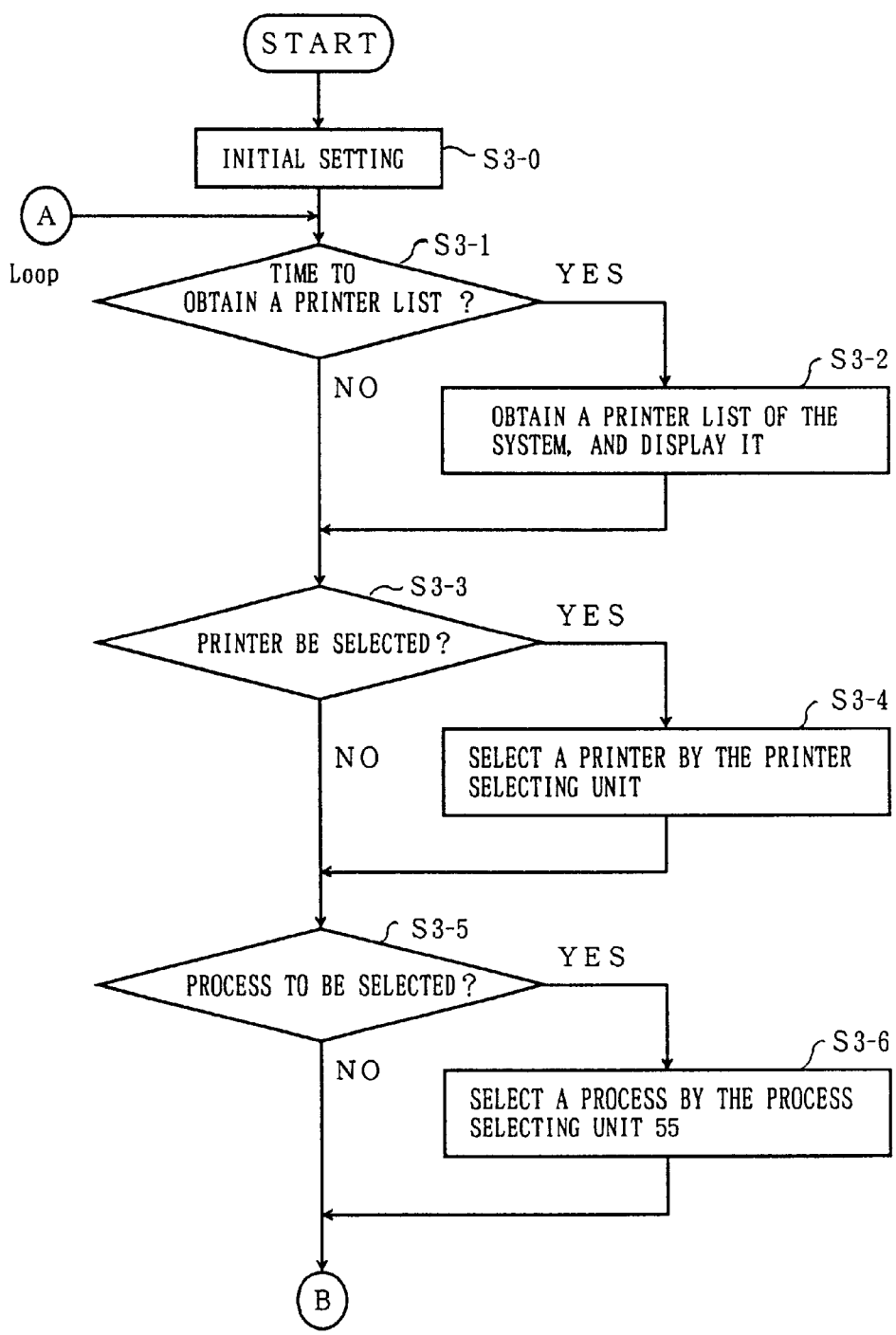
FIG. 21 is a flowchart of a process carried out by a selecting/setting device of the present invention.
Figure 22:
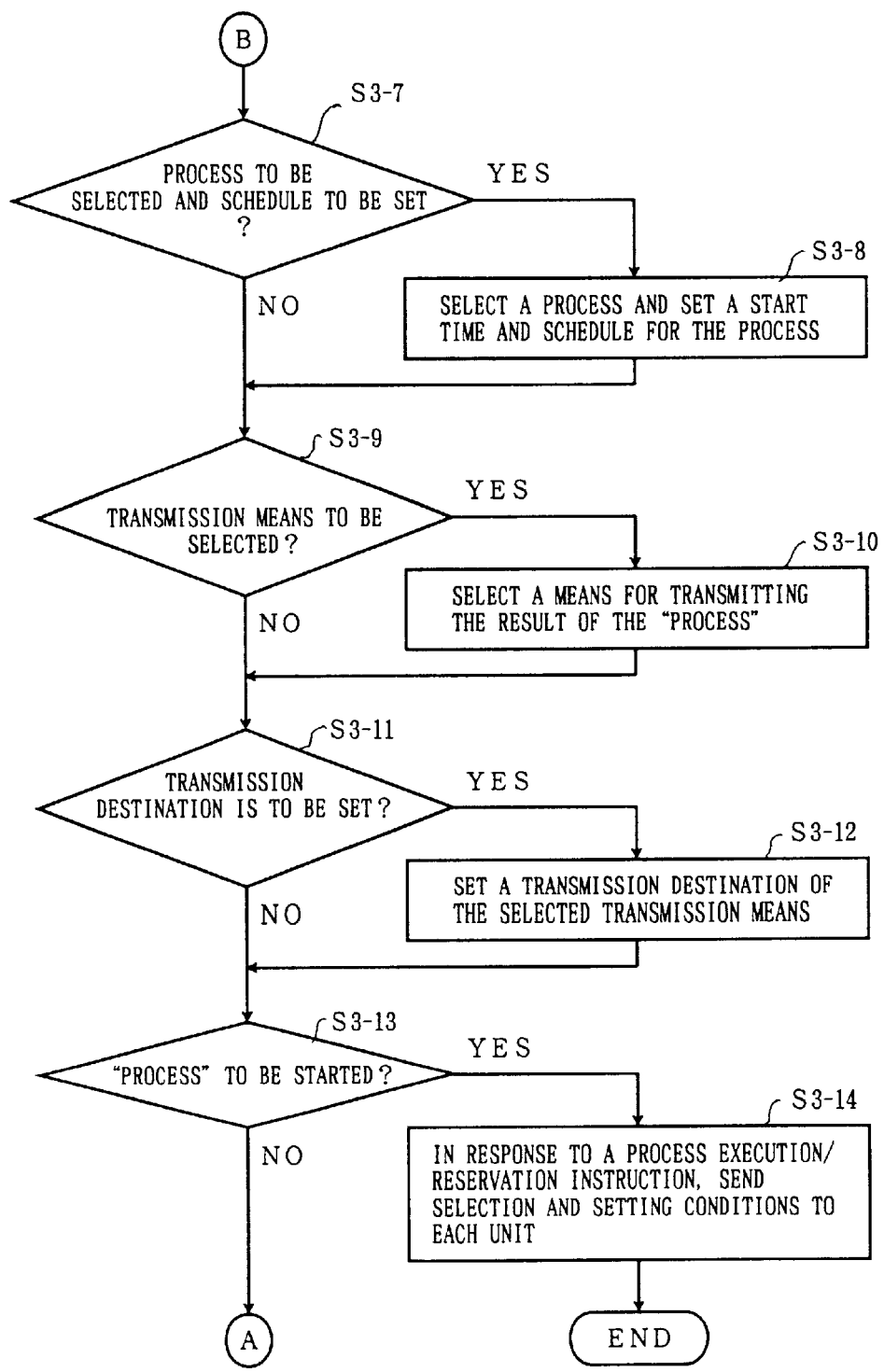
FIG. 22 is the flowchart (continued from FIG. 21) of the process carried out by the selecting/setting device of the present invention.

FIGS. 21 and 22 are flowcharts of a process carried out by the selecting/setting device 51 in the remote unit 12.

When the selecting/setting device 51 starts operating, an initial setting is carried out (step S3-0). The selecting/setting device 51 obtains the printer list of the printers 3-1 to 3-n from the local unit 11, and then displays it (steps S3-1 and S3-2). After the printer list is displayed, the printer selecting unit 57 can select a printer from the displayed printer list (steps S3-3 and S3-4). After the printer is selected, the process selecting unit 55 selects a process to be carried out (steps S3-5 and S3-6).

After the process is selected, the schedule setting unit 56 can set an execution schedule for the selected process (steps S3-7 and S3-8). Here, process execution intervals can be set instead of the execution schedule. Once the process execution schedule or intervals are set by the schedule setting unit 56, the transmission selecting unit 53 can select a transmission means (steps S3-9 and S3-10). After the transmission means is selected by the transmission selecting unit 53, the transmission destination setting unit 54 can set a transmission destination (steps S3-11 and S3-12). Once the transmission destination is set by the transmission destination setting unit 54, the process execution unit 58 can start carrying out the process (steps S3-13 and S3-14). The selecting/setting information set in steps S3-1 to 3-12 is sent to the local unit 11, thereby ending the selecting and setting by the selecting/setting device 51. If the process is not started in step S3-13, the operation returns to step S3-1 to perform the selecting and setting again.

Figure 23:
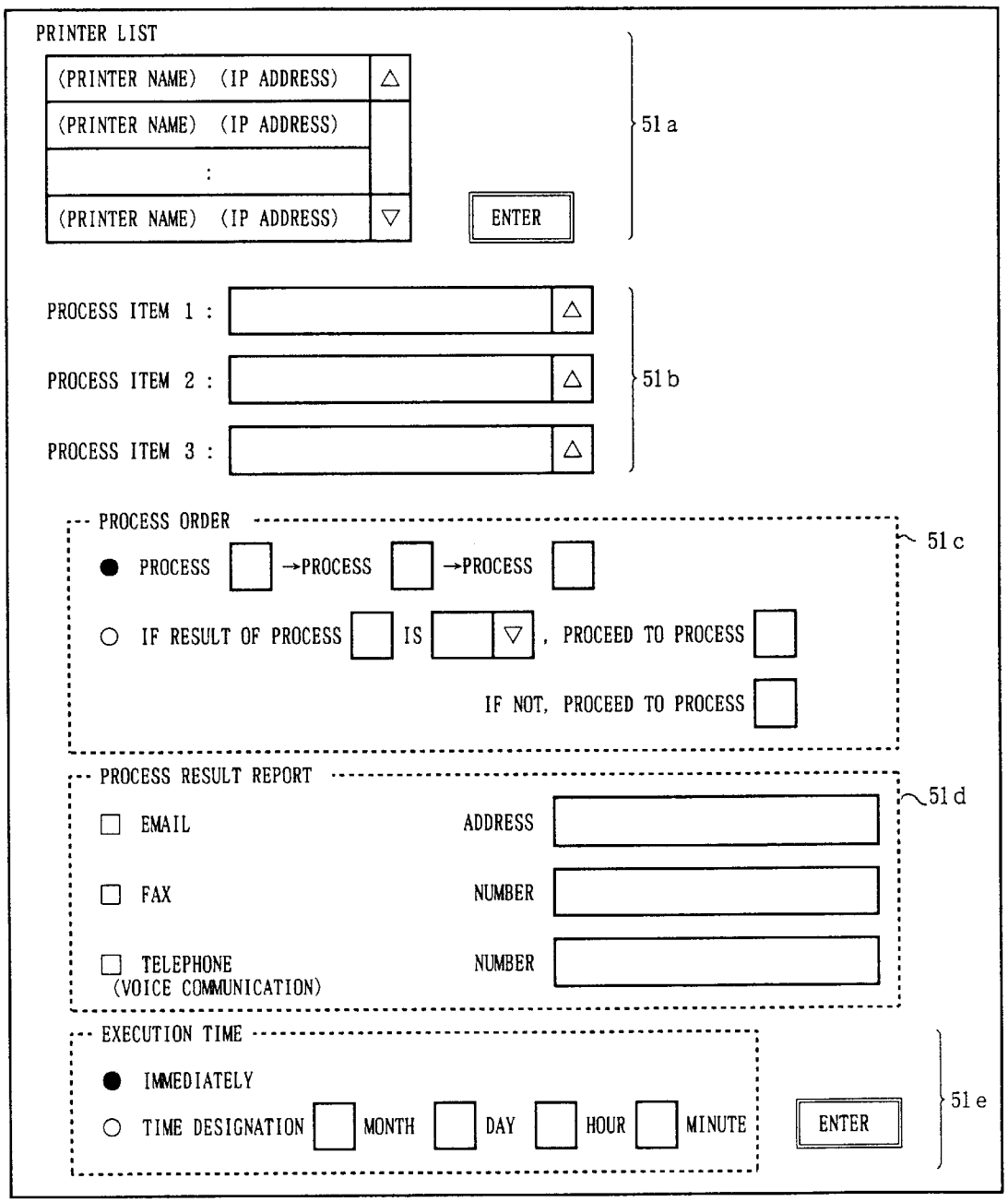
FIG. 23 shows a setting display of the selecting/setting device of the present invention.

FIG. 23 shows a selecting/setting display of the selecting/setting device 51.

The selecting/setting display of the selecting/setting device 51 comprises a printer selection display 51a, a process selection display 51b, a process order display 51c, a transmission selection display 51d, and a process execution display 51e.

The printer selection display 51a displays a printer list of connected printers. The printer selecting unit 57 selects and sets a desired printer from the printer list displayed on the printer selection display 51a. The process selection display 51b can register and display process items. A user can select a desired process from the displayed process items. The process order display 51c allows users to select a desired process order. The transmission selection display 51d displays transmission means, such as mail, facsimile, and telephone, and destinations and numbers can be inputted on the transmission selection display 51d. On the process execution display 51e, a user can select execution timing between immediate execution and reserved execution. In case of reserved execution, an execution date and time can be inputted.

Figure 24:
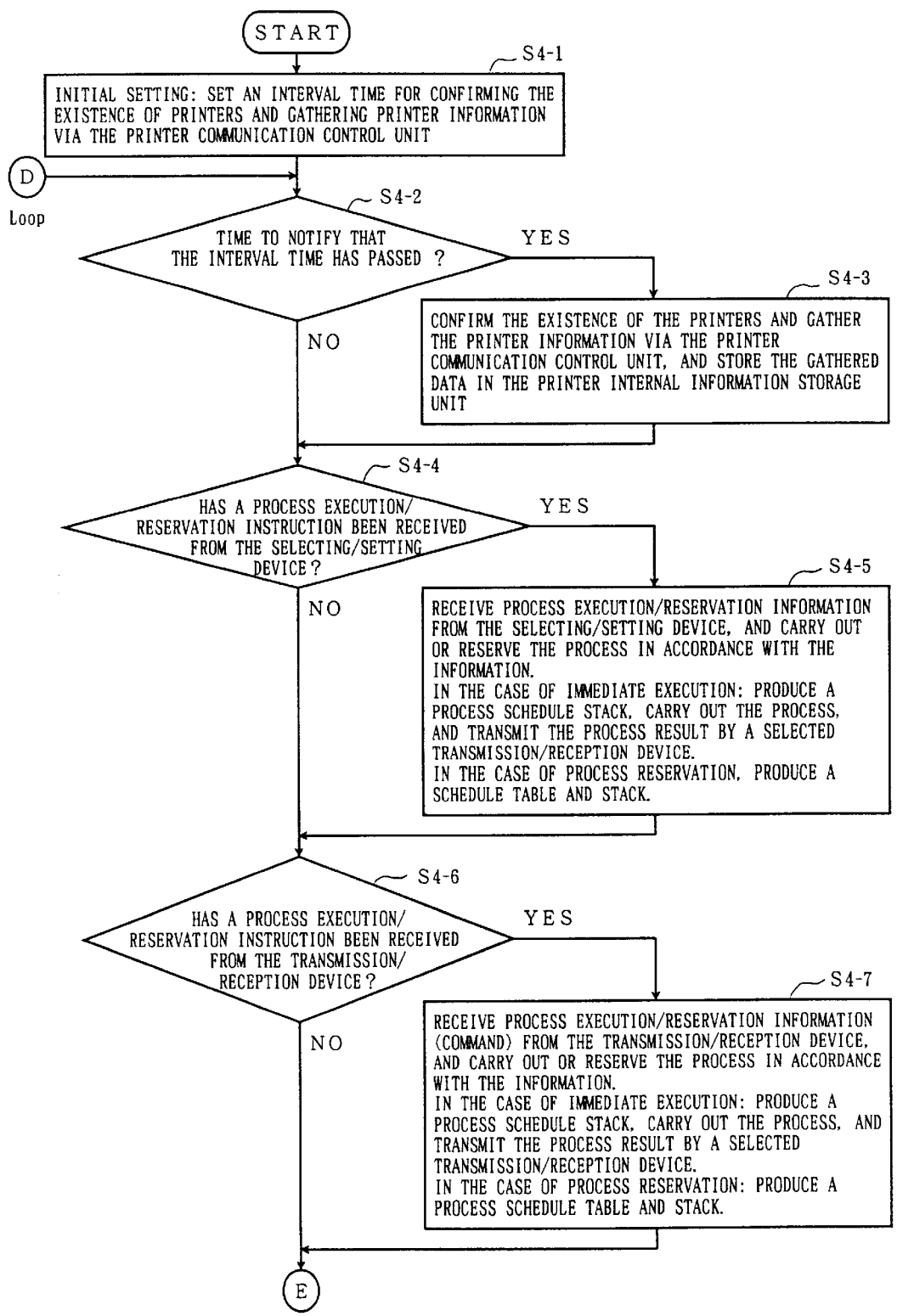
FIG. 24 is a flowchart of a process carried out by a process execution unit of the present invention.
Figure 25:
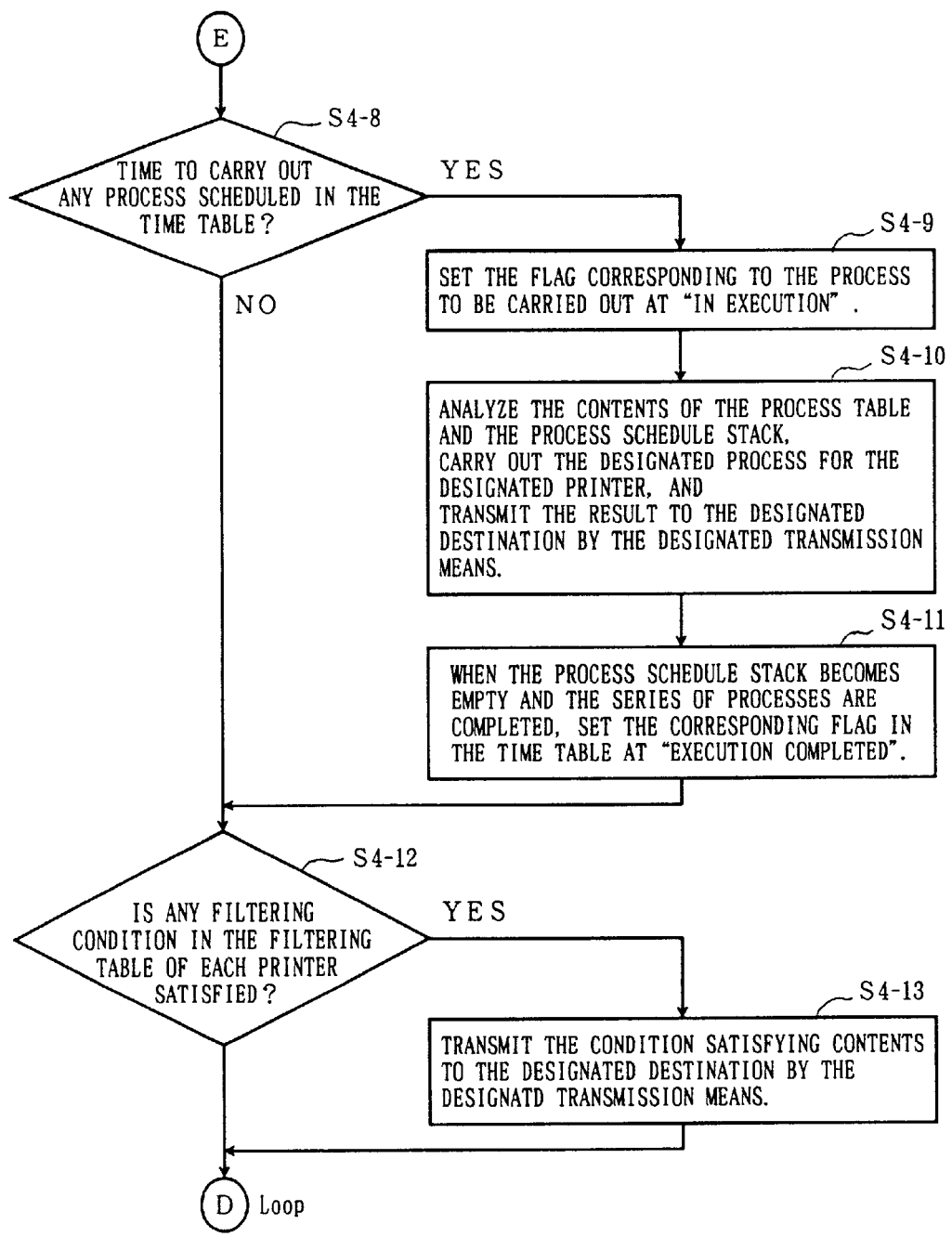
FIG. 25 is the flowchart (continued from FIG. 24) of the process carried out by the selecting/setting device of the present invention.

FIGS. 24 and 25 are flowcharts of the process execution unit 22 of the local unit 11.

After the selecting/setting device 51 sets the process to be carried out and sends the selected results and values to the process execution unit 22, the process execution unit 22 confirms the existence of the printers 3-1 to 3-n via the printer communication control unit 21, and sends the calendar/timer unit 24 the schedule or intervals for gathering the printer condition information and printer internal information (step S4-1).

The calendar/timer unit 24 then judges whether it is time to gather the printer condition information and printer internal information of the printers 3-1 to 3-n (step S4-2). If it is, the existence of the printers 3-1 to 3-n is confirmed through the printer communication control unit 21, and the printer internal information of each of the printers 3-1 to 3-n is gathered and stored in the printer internal information storage unit 27 (step S4-3).

The process execution unit 22 then judges whether a process execution/reservation notice has been sent from the selection/setting device 51 (step S4-4). If the process execution/reservation notice has been sent from the selecting/setting device 51, the process execution unit 22 carries out or reserves the process (step S4-5). In the case of immediate execution, a process schedule is produced, and the process is immediately carried out. The result obtained by the process execution is transmitted by one of the transmission/reception devices 52-1 to 52-m selected by the selecting/setting device 51. In the case of process reservation, only the process schedule is produced.

The process execution unit 22 next judges whether a process execution/reservation notice has been sent from the transmission/reception devices 52-1 to 52-m (step S4-6). If the process execution/reservation notice has been received from the transmission/reception devices 52-1 to 52-m, the process execution unit 22 carries out or reserves the process (step S4-7). In the case of immediate execution, a process schedule is produced, and the process is immediately carried out. The result obtained by the process execution is transmitted by one of the transmission/reception devices 52-1 to 52-m selected by the selecting/setting device 51. In the case of process reservation, only the process schedule is produced.

The process execution unit 22 next judges whether it is time to carry out any of reserved processes listed on the time table, referring to the job schedule control unit 25 (step S4-8). If it is, the flag of the corresponding process in the job schedule control unit 25 is set at "in execution" (step S4-9).

The designated process is then carried out for a printer designated by analyzing the contents of the designated process, and the execution result is transmitted to a designated destination by a designated transmission means (step 4-10).

When the process specified in the job schedule control unit 25 is completed, the corresponding flag in the job schedule control unit 25 is set at "execution completed" (step S4-11).

Next, the filtering applying unit 36 carries out a filtering applying process, and transmits the filtering condition satisfying information to the designated destination by the designated transmission means (steps S4-12 and S4-13).

Figure 26:
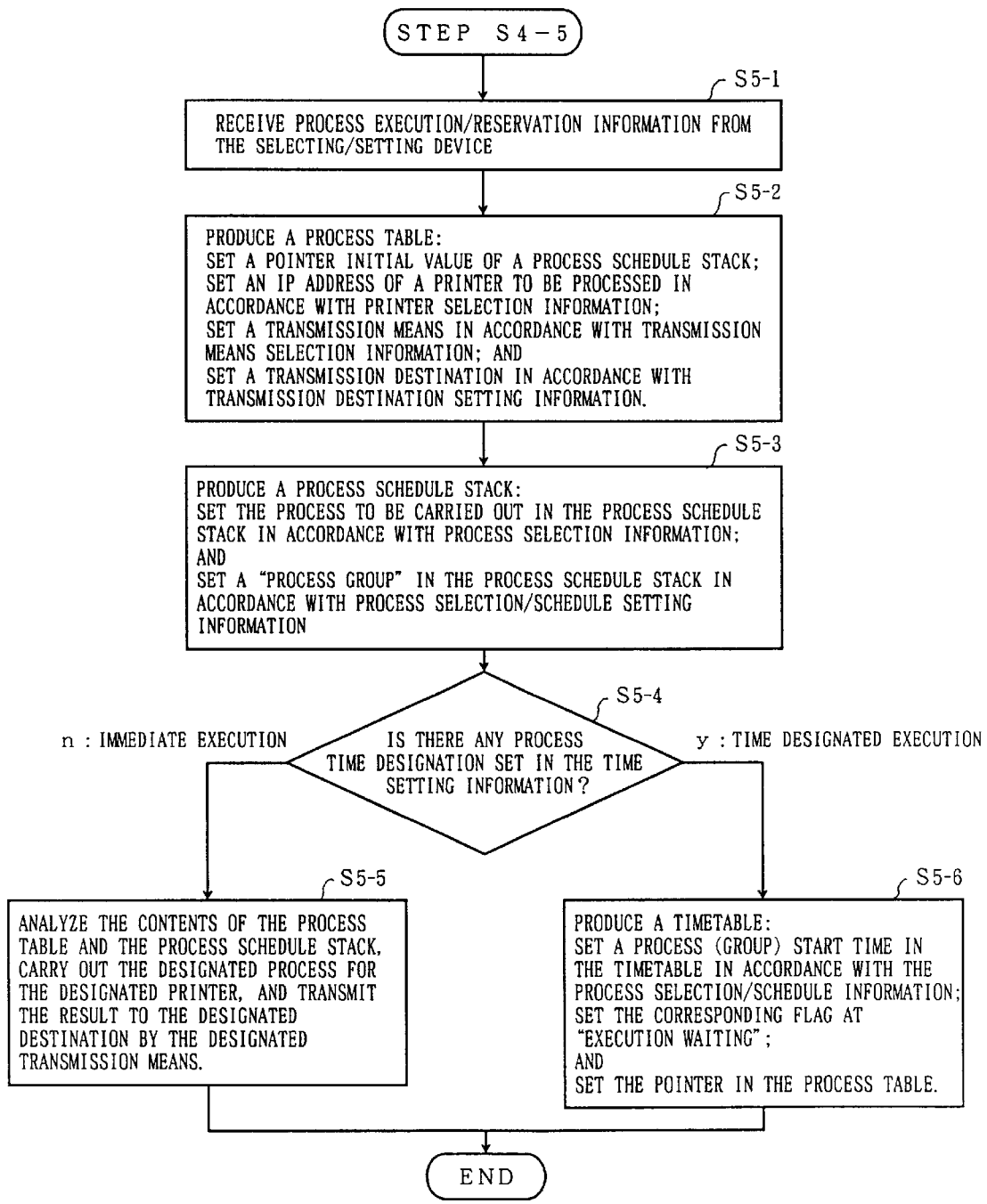
FIG. 26 is a flowchart of an execution and reservation process carried out by the process execution unit of the present invention.

FIG. 26 is a flowchart of the process execution and process reservation in the process execution unit 22 of this embodiment.

When process execution/reservation information selected and set by the selecting/setting device 51 is received, the process execution unit 22 produces a process table in accordance with the information on the selected printer, the set transmission means, and the transmission destination included in the process execution/reservation information (step S5-2).

After the process table is produced, the process execution unit 22 produces a process schedule stack in accordance with the process selection information included in the process execution/reservation information selected and set by the selecting/setting device 51 (step S5-3).

The process execution unit 22 then judges from the time setting information included in the process execution/reservation information whether there is a time designation for any process (step S5-4). If there is no time designation, the contents in the process table and the process schedule stack produced in steps S5-2 and S5-3 are analyzed, and the designated process is carried out (step S5-5). If there is a time designation in step S5-4, a timetable (described later) is produced.

FIGS. 27A and 27B show the data structures of the timetable and the process table of this embodiment. FIG. 27A shows the timetable, and FIG. 27B shows the process table.

As shown in FIG. 27A, the timetable is made up of start times, execution state flags, and process pointers. Each of the start times indicates the start time of a corresponding process. Each of the execution state flags indicates the execution state of a corresponding process: "execution waiting", "in execution", or "execution completed".

Each of the process pointers indicates the initial value of a corresponding process. The process execution unit 22 compares the time in the calendar/timer unit 24 with the start time in the timetable to carry out a corresponding designated process. The designated process is determined by searching the process table from the point set by the process pointer for the initial value of the schedule stack pointer in the process table. Once the process is started, the flag is changed from "execution waiting" to "in execution". When the process is completed, the flag is changed to "execution completed".

As shown in FIG. 27B, the process table is made up of the initial values of the process schedule stack pointers, the numbers of printers to be processed, the IP addresses of the printers to be processed, the numbers of transmission means, the transmission means, the numbers of transmission destinations, and the transmission destination addresses.

Each of the process pointers in the timetable searches for a corresponding process in the process table. At the start of each corresponding process, the initial value of the schedule stack pointer of the process is set, and the process carried out from the initial value of the process schedule stack pointer. The printer to be processed is also set in process table. The process result is transmitted to the transmission destination set in the process table by the transmission means also set in the process table.

Figure 28:
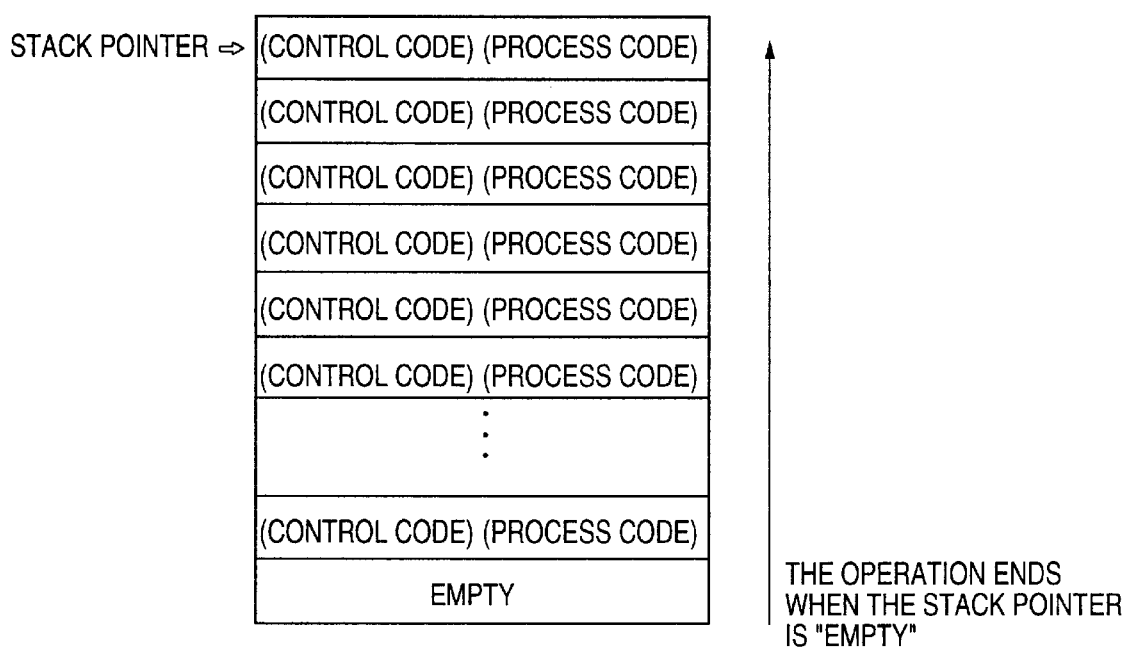
FIG. 28 shows the data structure of a process schedule stack of the present invention.

FIG. 28 shows the data structure of the process schedule stack of the above embodiment.

The process schedule stack stores control codes and process codes in the order of execution. A stack pointer is set to the process schedule stack. Every time a process is completed, the stack pointer moves on to the next process. The end of the process schedule stack is "Empty", and when the stack pointer comes to the "Empty", the operation is stopped.

FIG. 29 shows the control codes and the process codes set in the process schedule stack.

The control codes include "Do", "Result", "Result Good", "Result NG", "Result True", "Result False", "Result Good then Do", "Result NG then Do", "Result True then Do", "Result False then Do", and "End". The process is determined by combining one of the control codes and one of the process codes shown in FIG. 29. Each of the process codes is made up of a process outline code and a process detail code (parameter).

Figure 30:
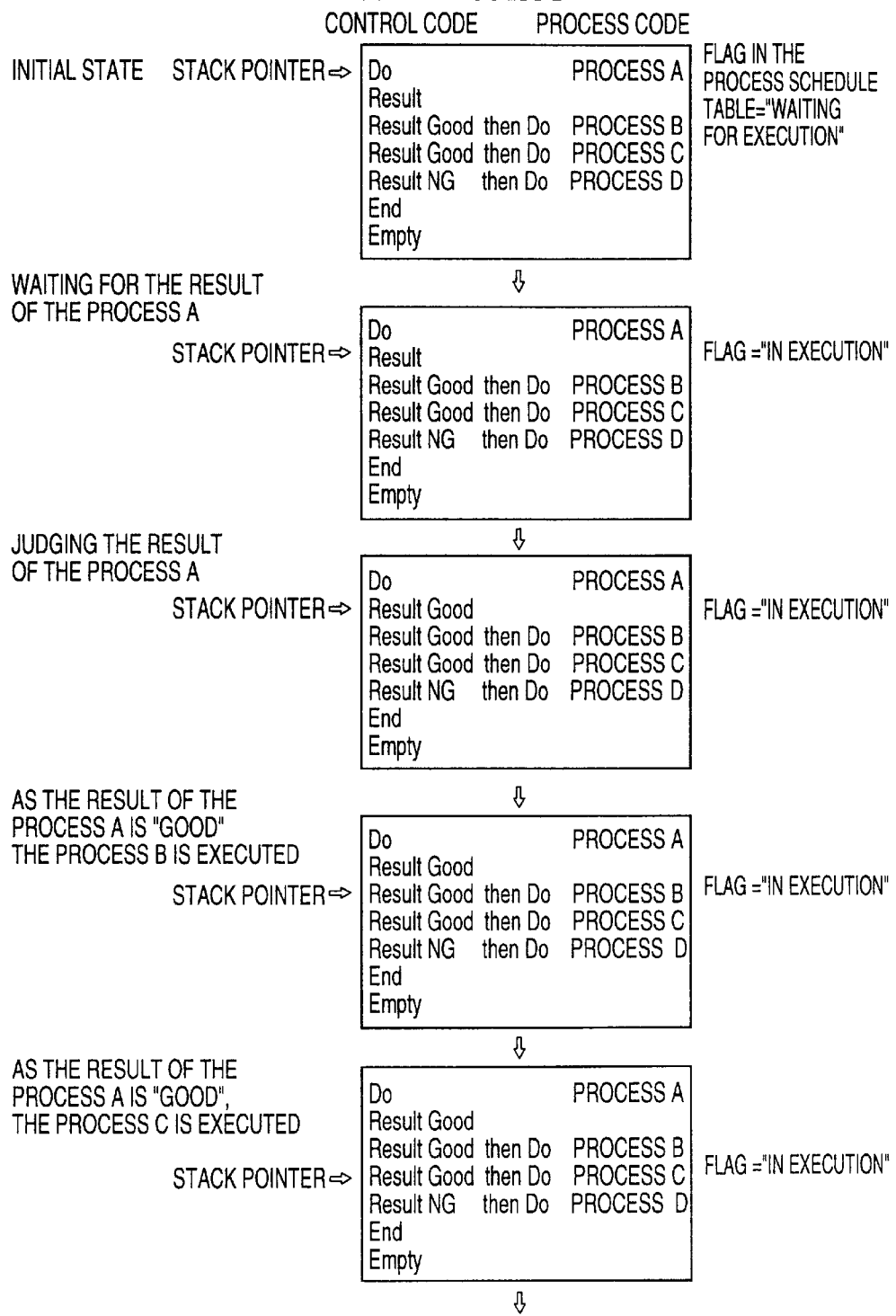
FIG. 30 shows a process carried out in accordance with the process schedule stack of the present invention.
Figure 31:
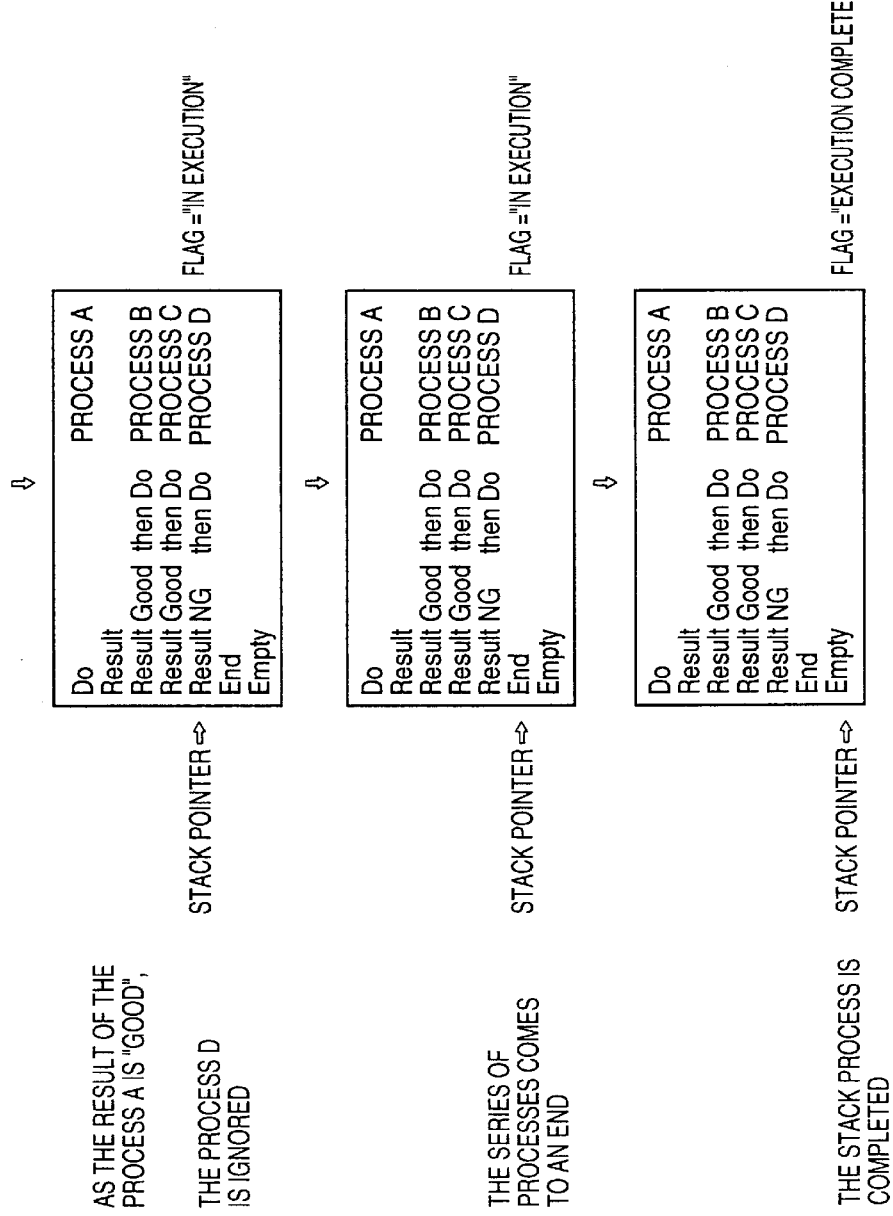
FIG. 31 shows the process (continued from FIG. 30) carried out in accordance with the process schedule stack of the present invention.

FIGS. 30 and 31 show an example of the process schedule stack.

The process schedule stack shown in FIGS. 30 and 31 is used to carry out the following process: "if the result of a process A is 'Good', execute processes B and C; and if the result of the process A is 'No Good', execute a process D". To carry out the process, it is necessary to set the process schedule stack as shown in FIGS. 30 and 31: control code "Do"→process code "Process A"→control code "Result"→control code "Result Good then Do"→process code "Process B →control code "Result Good then Do"→process code "Process C"→control code "Result NG then Do"→process code "Process D"→control code "End"→Empty".

In the initial state, the stack pointer points at the control code "Do" and the process code "Process A". The process A is carried out in accordance with the control code "Do" and the process code "Process A".

The stack pointer next points at the control code "Result", and waits for the process A to be completed. When the process A is completed, the process result is judged. If the process result of the process A is judged to be "Good", the control code "Good" is allocated to the control code "Result".

With the result of the process A as the process code corresponding to the control code "Result" being "Good", the stack pointer points at the control code "Result Good then Do" and the process code "Process B". Since the result of the process A is "Good", the process B is then executed.

After the process B is executed, the stack pointer moves on to the control code "Result Good then Do" and the process code "Process C". Since the result of the process A is "Good", the process C is executed.

After the process C is completed, the stack pointer points at the control code "Result NG then Do" and the process code "process D". Since the result of the process A is "Good", the process D is ignored. Then the stack pointer points at the control code "End", so that the end of the process is recognized. The stack pointer then points at "Empty", thereby finishing the stack process.

If, on the other hand, the result of the process A at the control code "Result" is "NG", only the process D is executed, in accordance with the control code "Result NG then Do" and the process code "Process D". The stack process then comes to an end in the above-described manner.

Figure 32:
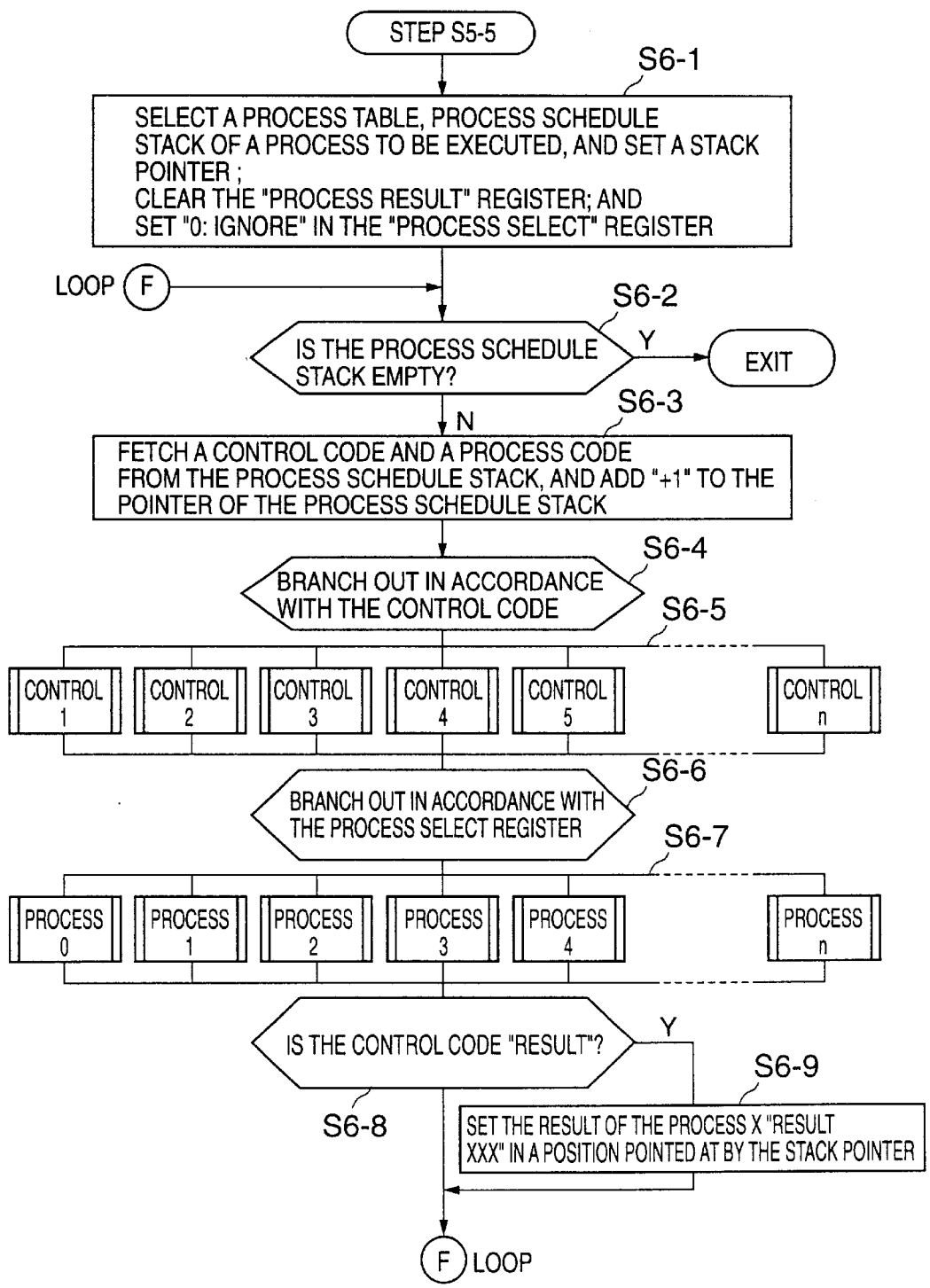
FIG. 32 is a flowchart of a process at the time of process execution of the present invention.

FIG. 32 is a process flowchart of the process execution of this embodiment.

In step S5-5, a process table and a process schedule stack corresponding to the process to be carried out are selected, and a stack pointer is set (step S6-1). Here, the register for storing process results and the register for selecting a process are set at "0", i.e., "Ignore".

Next, whether the process schedule stack is "Empty" is judged (step S6-2). If the process schedule stack is "Empty", the process comes to an end. If there is a control code in the process schedule stack, the control code and the process code are fetched from the process schedule stack, and "+1" is added to the pointer of the process schedule stack (step S6-3).

In accordance with the fetched control code, a control operation is performed (steps S6-4 and S6-5). Also, in accordance with the fetched process code, the process is carried out (steps S6-6 and S6-7).

It is then judged from the fetched control code whether the control code is "Result" or not (step 6-8). If the control code is not "Result", the operation goes back to step S6-2, and the process is carried out. If the control code is judged to be "Result" in step S6-8, the result of the process set as the process code is set in a position pointed at by the stack pointer (step S6-9).

Figure 33A:
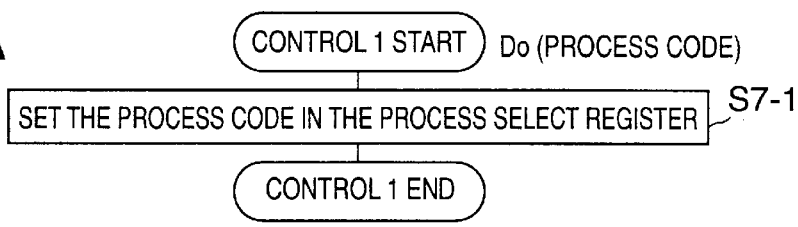
FIGS. 33A to 33E are flowcharts of processes carried out in accordance with the respective control codes of the present invention.
Figure 33B:
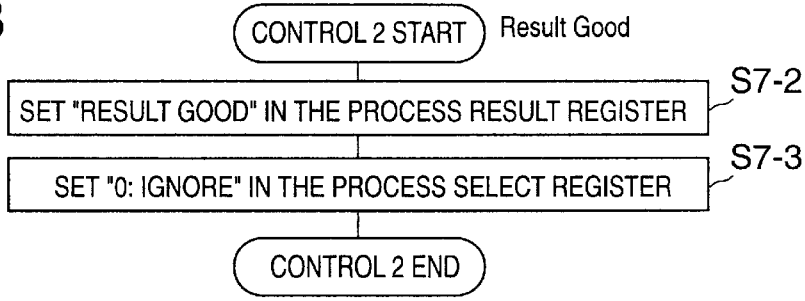
Figure 33C:
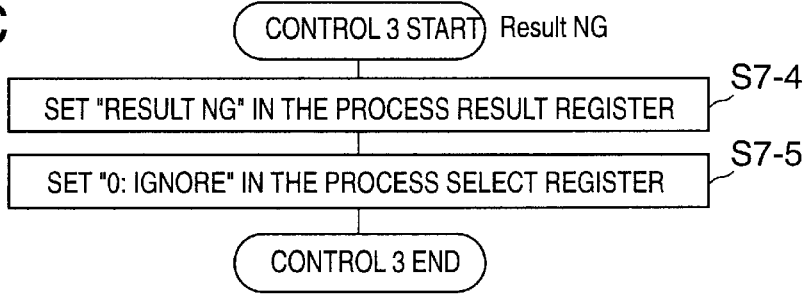
Figure 33D:
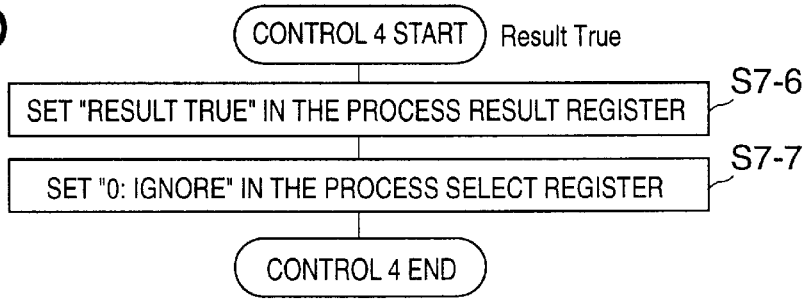
Figure 33E:
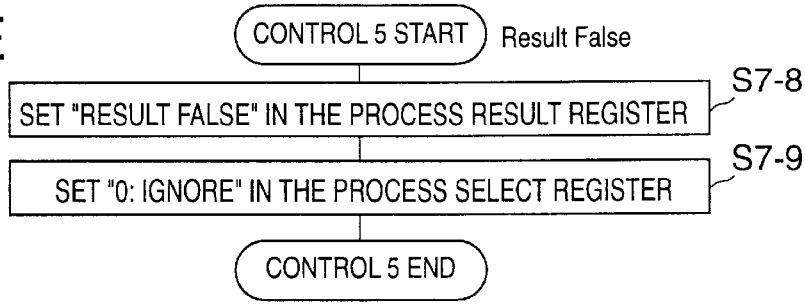
Figure 34A:
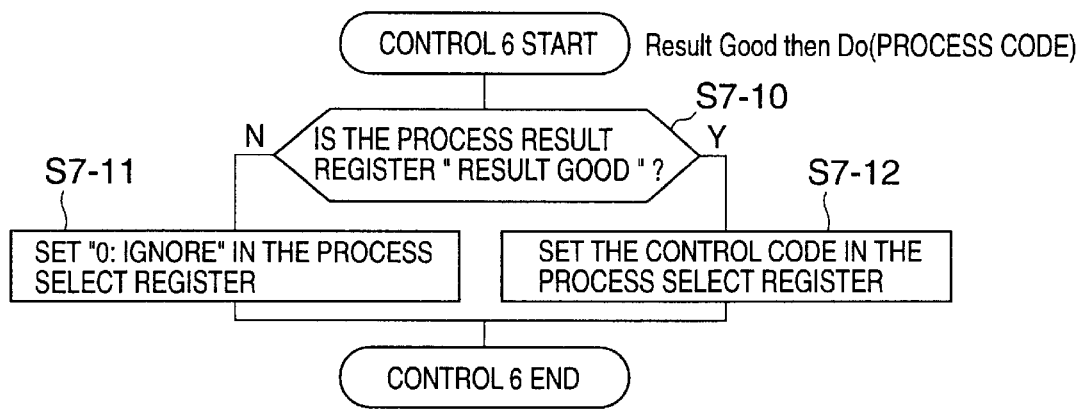
FIGS. 34A to 34C are flowcharts of processes carried out in accordance with the respective control codes of the present invention.
Figure 34B:
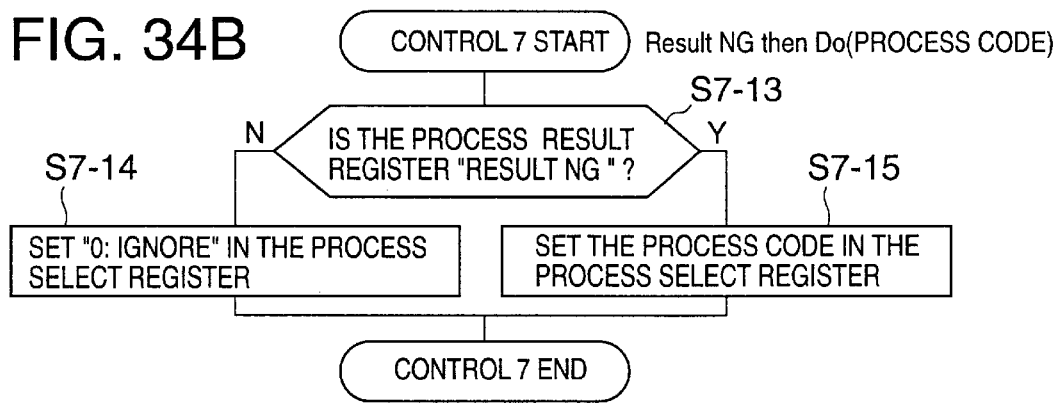
Figure 34C:
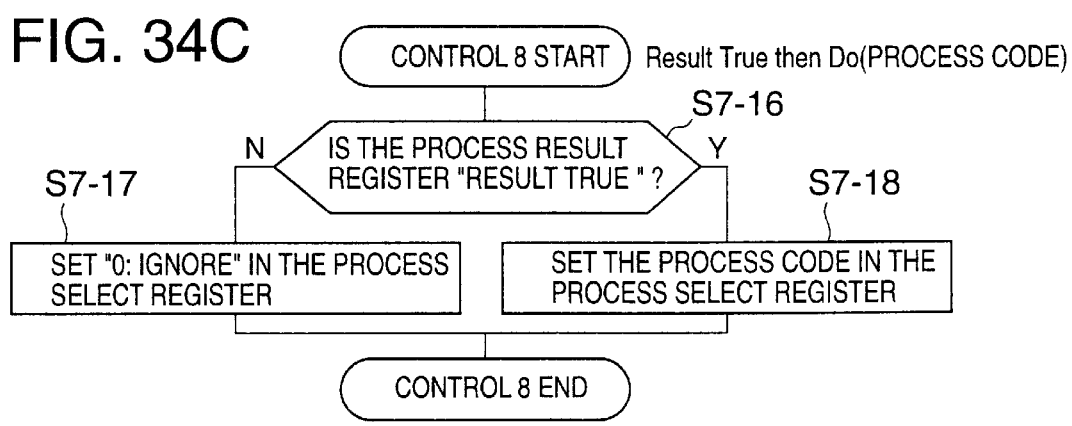
Figure 35A:
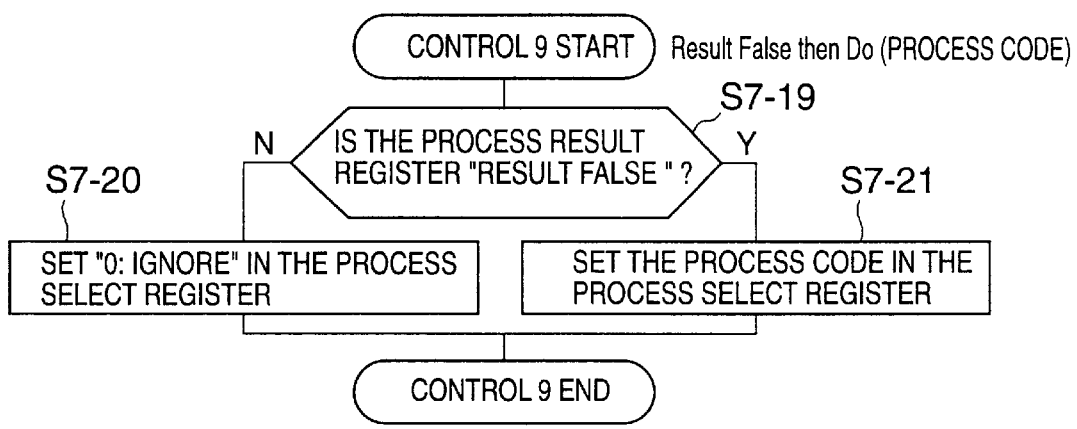
FIGS. 35A and 35B are flowcharts of processes carried out in accordance with the respective control codes of the present invention.
Figure 35B:
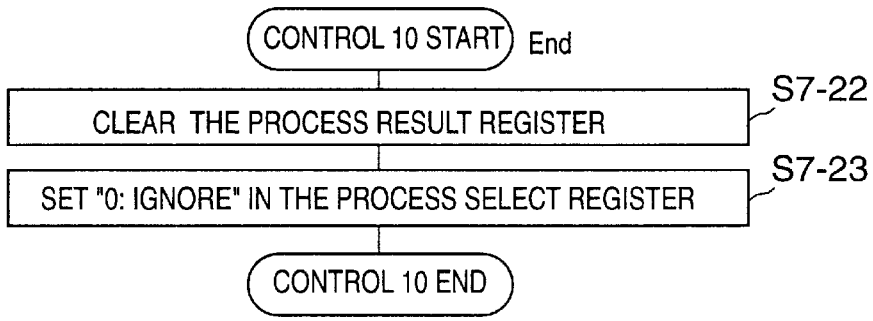

FIGS. 33A to 35B are process flowcharts of the respective control codes. More specifically, FIG. 33A is a flowchart of the control code "Do (process code)"; FIG. 33B is a flowchart of the control code "Result Good"; FIG. 33C is a flowchart of the control code "Result NG"; FIG. 33D is a flowchart of the control code "Result True"; FIG. 33E is a flowchart of the control code "Result False"; FIG. 34A is a flowchart of the control code "Result Good then Do (process code)"; FIG. 34B is a flowchart of the control code "Result NG then Do (process code)"; FIG. 34C is a flowchart of the control code "Result True then Do (process code)"; FIG. 35A is a flowchart of the control code "Result False then Do (process code)"; and FIG. 35B is a flowchart of the control code "End".

The control code "Do (process code)" sets the process code in the process select register (step S7-1), as shown in FIG. 33A.

The control code "Result Good" sets "Result Good" in the process result register (step S7-2), and then sets "0: Ignore" in the process select register (step S7-3), as shown in FIG. 33B.

The control code "Result NG" sets "Result NG" in the process result register (step S7-4), and sets "0: Ignore" in the process select register (step S7-5), as shown in FIG. 33C.

The control code "Result True" sets "Result True" in the process result register (step S7-6), and then sets "0: Ignore" in the process select register (step S7-7), as shown in FIG. 33D.

The control code "Result False" sets "Result False" in the process result register (step S7-8), and then sets "0: Ignore" in the process select register (step S7-9), as shown in FIG. 33E.

The control code "Result Good then Do (process code)" judges whether the contents of the process result register are "Result Good" (step S7-10), as shown in FIG. 34A. If the contents of the process result register is not "Result Good", "0: Ignore" is set in the process select register (step S7-11). The process of the process result register is "Result Good", the process code is set in the process select register (step S7-12).

The control code "Result NG then Do (process code)" judges whether the contents of the process result register are "Result NG" (step S7-13), as shown in FIG. 34B. If the contents of the process result register is not "Result NG", "0: Ignore" is set in the process select register (step S7-14). If the contents of the process result register is "Result NG", the process code is set in the process select register (step S7-15).

The control code "Result True then Do (process code)" judges whether the contents of the process result register are "Result True" (step S7-16), as shown in FIG. 34C. If the contents of the process result register are not "Result True", "0: Ignore" is set in the process select register (step S7-17). If the contents of the process result register are "Result True", the process code is set in the process select register (step S7-18).

The control code "Result False then Do (process code)" judges whether the contents of the process result register are "Result False" (step S7-19), as shown in FIG. 35A. If the contents of the process result register are not "Result False", "0: Ignore" is set in the process select register (step S7-10). If the contents of the process result register are "Result False", the process code is set in the process select register (step S7-21).

The control code "End" clears the process result register (step S7-22), and sets "0: Ignore" in the process select register (step S7-23), as shown in FIG. 35B.

Figure 36A:
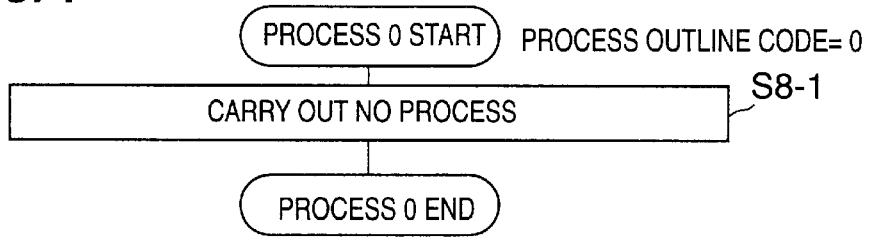
FIGS. 36A to 36D are flowcharts of processes carried out in accordance with the respective process codes of the present invention.
Figure 36B:
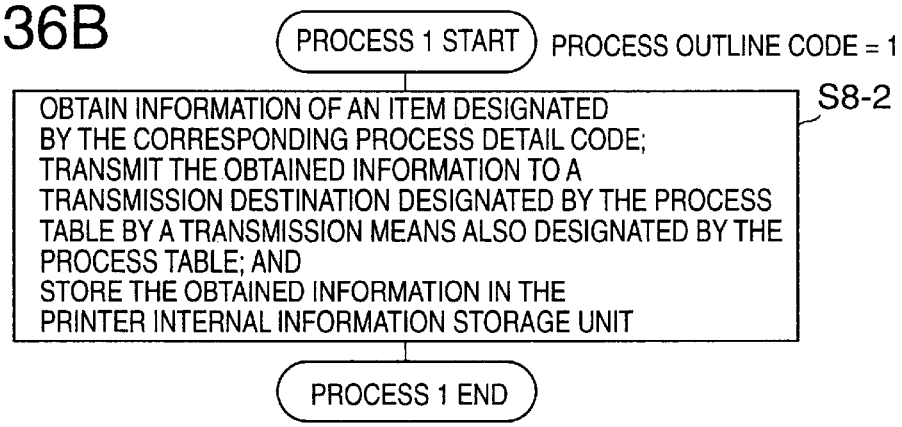
Figure 36C:
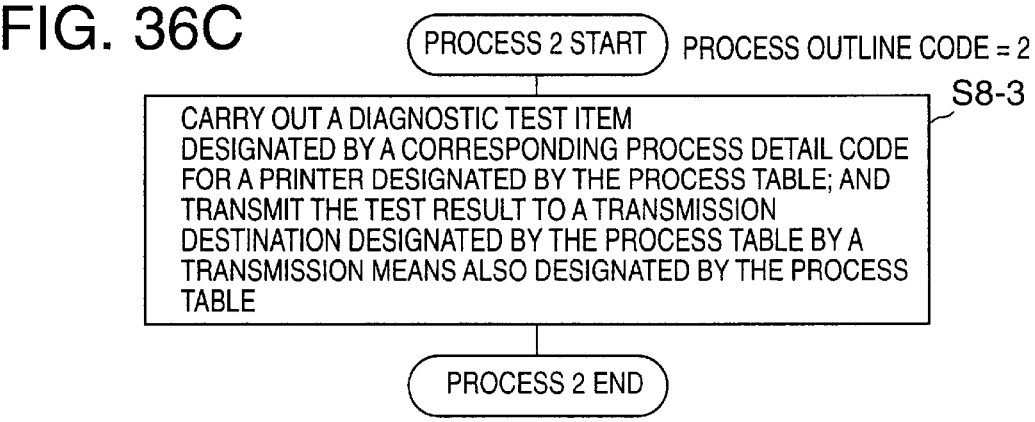
Figure 36D:
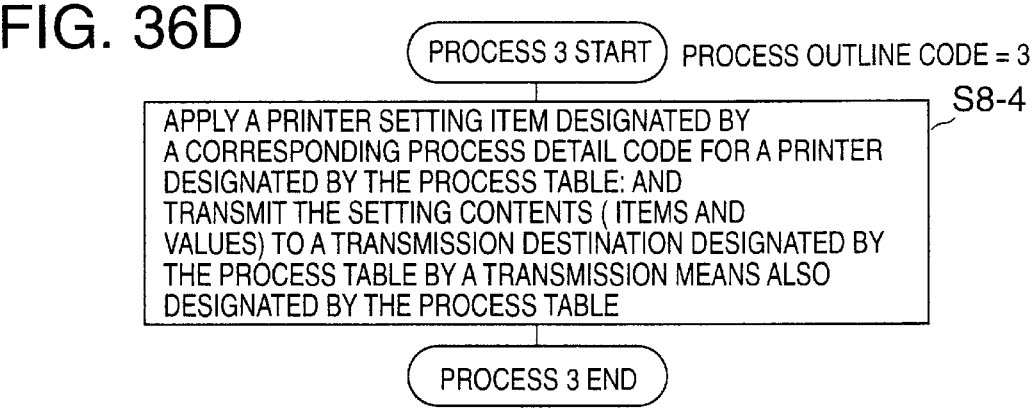
Figure 37A:
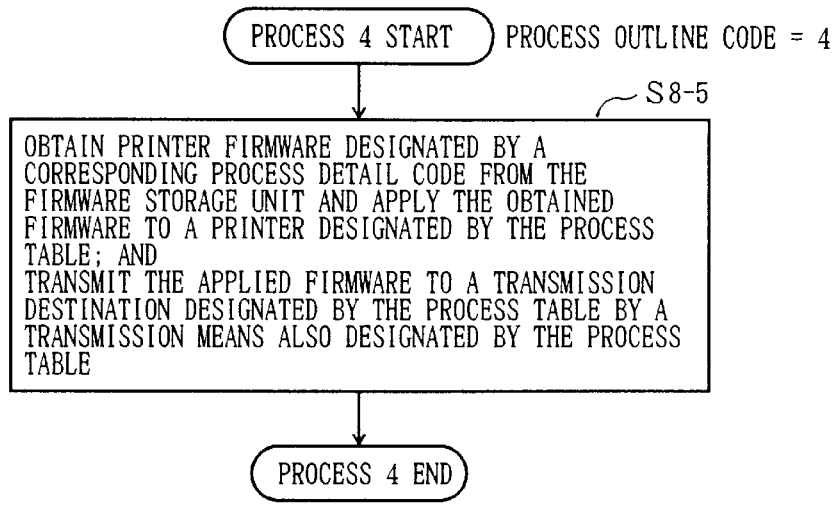
FIGS. 37A and 37B are flowcharts of processes carried out in accordance with the respective process codes of the present invention.
Figure 37B:
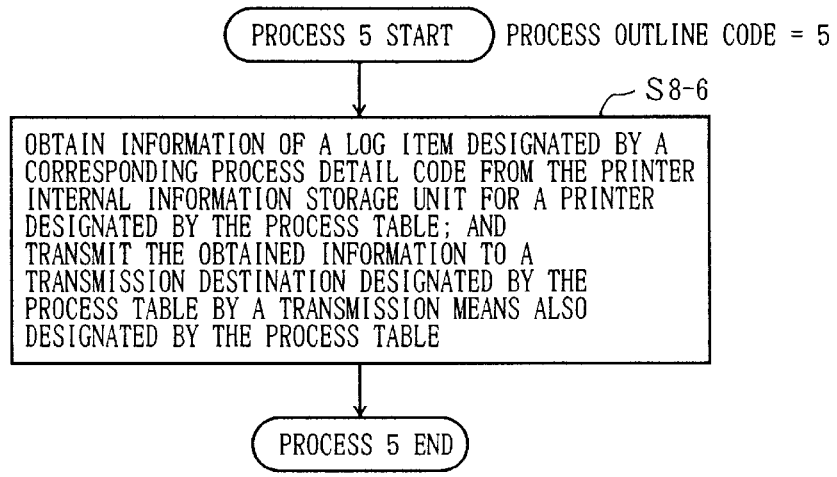
Figure 38A:
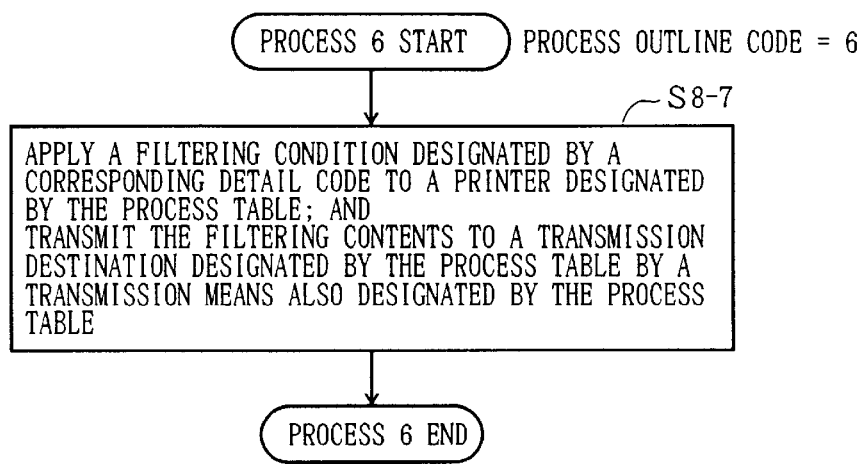
FIGS. 38A and 38B are flowcharts of processes carried out in accordance with the respective process codes of the present invention.
Figure 38B:
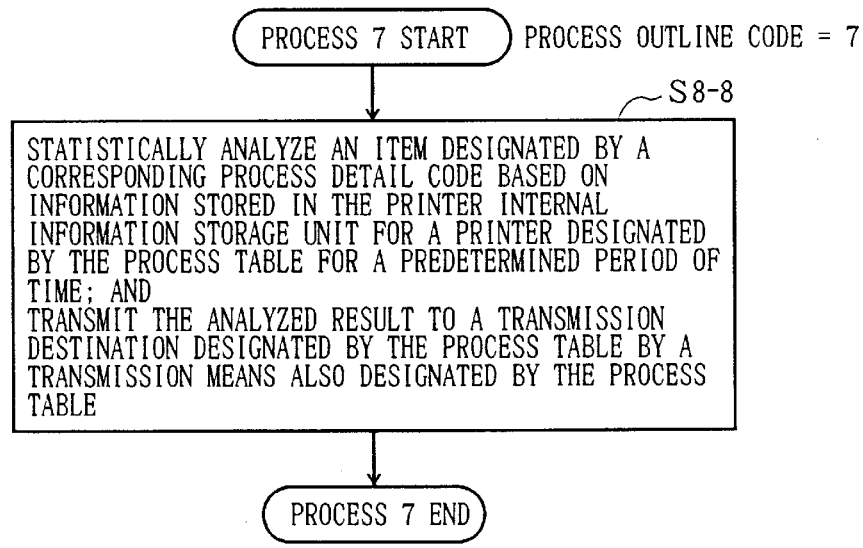

FIGS. 36A to 38B are flowcharts of the respective process outline codes of this embodiment. More specifically, FIG. 36A is a flowchart of a process outline code "0"; FIG. 36B is a flowchart of a process outline code "1"; FIG. 36C is a flowchart of a process outline code "2"; FIG. 36D is a flowchart of a process outline code "3"; FIG. 3 7A is a flowchart of a process outline code "4"; FIG. 37B is a flowchart of a process outline code "5"; FIG. 38A is a flowchart of a process outline code "6"; and FIG. 38B is a flowchart of a process outline code "7".

The process outline code "0" carries out no process (step S8-1), as shown in FIG. 36A.

The process outline code "1" obtains information on an item designated by a corresponding process detail code from a printer designated in the process table, transmits the obtained information to a transmission destination designated in the process table by a transmission means also designated in the process table, and then stores the obtained information in the printer internal information storage unit 27 (step S8-2).

The process outline code "2" obtains and carries out a diagnostic test designated by a corresponding process detail code for a printer designated in the process table, and transmits the test result to a transmission destination designated in the process table by a transmission means also designated in the process table (step S8-3).

The process outline code "3" applies a printer setting item designated by a corresponding process detail code to a printer designated in the process table, and transmits the setting contents (items and values) to a transmission destination designated in the process table by a transmission means also designated in the process table (step S8-4).

The process outline code "4" obtains firmware of a type and version designated by a corresponding process detail code from the firmware storage unit, applies the firmware to a printer designated in the process table, and transmits the applied firmware to a transmission destination designated in the process table by a transmission means also designated in the process table (step S8-5).

The process outline code "5" obtains log item information designated by a corresponding process detail code from the printer internal information storage unit 27 for a printer designated in the process table, and transmits the contents of the obtained log item information to a transmission destination designated in the process table by a transmission means also designated in the process table (step S8-6).

The process outline code "6" applies a filtering condition designated by a corresponding process detail code for a printer designated in the process table, and transmits the contents of the applied filtering to a transmission destination designated in the process table by a transmission means also designated in the process table (step S8-7).

The process outline code "7" statistically analyzes a statistical analysis item designated by a corresponding process detail code for a printer designated in the process table based on information stored in the printer internal information storage unit 27 for a predetermined period of time, and transmits the analyzed result to a transmission destination designated in the process table by a transmission means also designated in the process table (step S8-8).

FIGS. 39A and 39B illustrate the operation of the filtering process of the process outline code "6". FIG. 39A shows filtering tables, and FIG. 39B shows a filtering process table.

The filtering table of each printer contains filtering conditions, flags for indicating whether each filtering condition is applied or not, and pointer positions of information to be applied to the process table. The process table of each filter condition stores a message for a satisfied condition, the number of transmission means, transmission means, the number of destinations of each transmission means, and transmission destinations.

When filtering is applied, the flag is set at "applied", and the filtering is carried out under the filtering condition set in the filtering table. When the filtering condition is satisfied, the process table is searched from the pointer position in the filtering table so as to fetch the corresponding satisfied condition message. The satisfied condition message is then transmitted to a transmission destination designated in the process table by a transmission means also designated in the process table.

Figure 40:
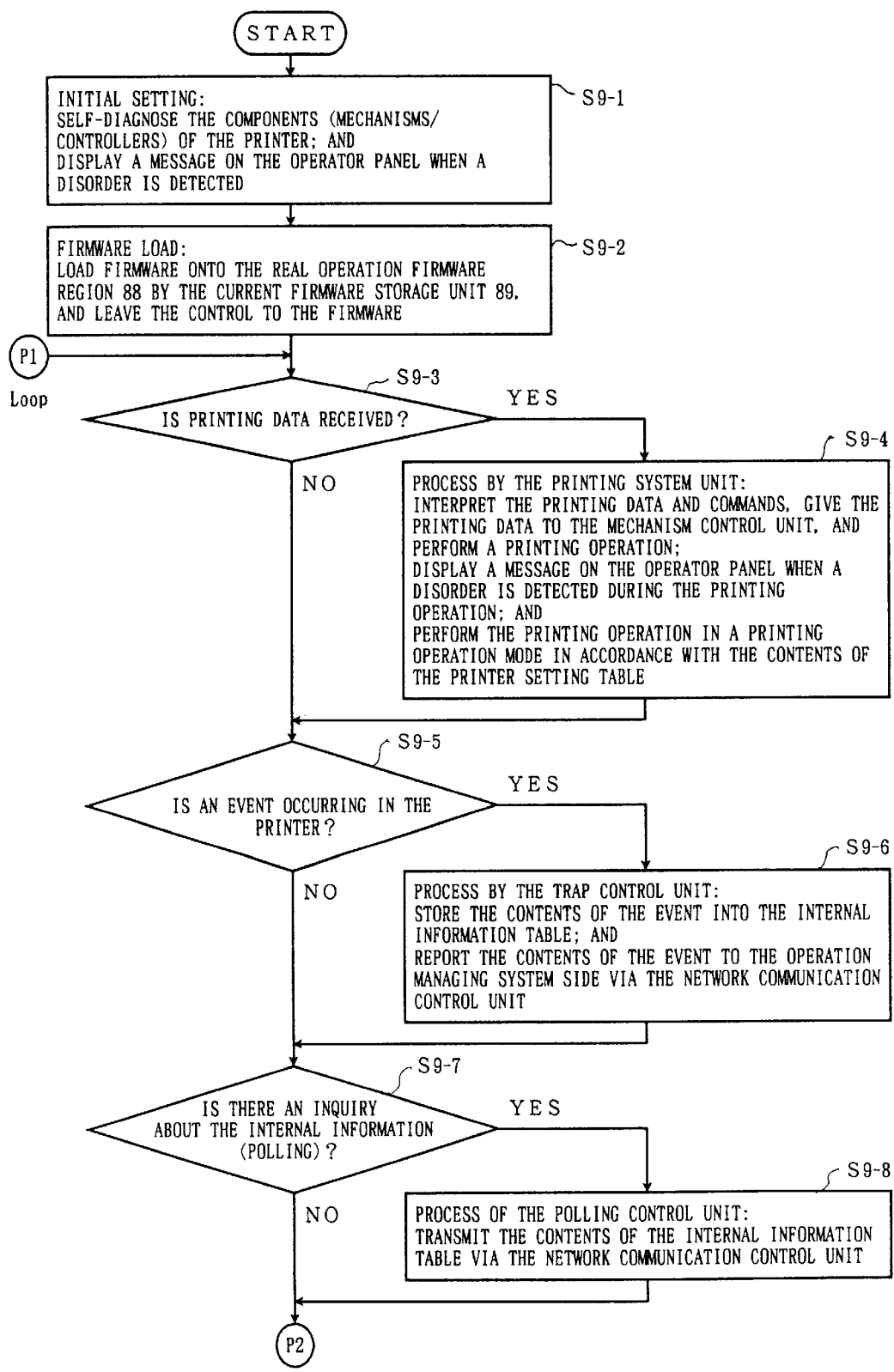
FIG. 40 is a flowchart of a process carried out by a printer of the present invention.
Figure 41:
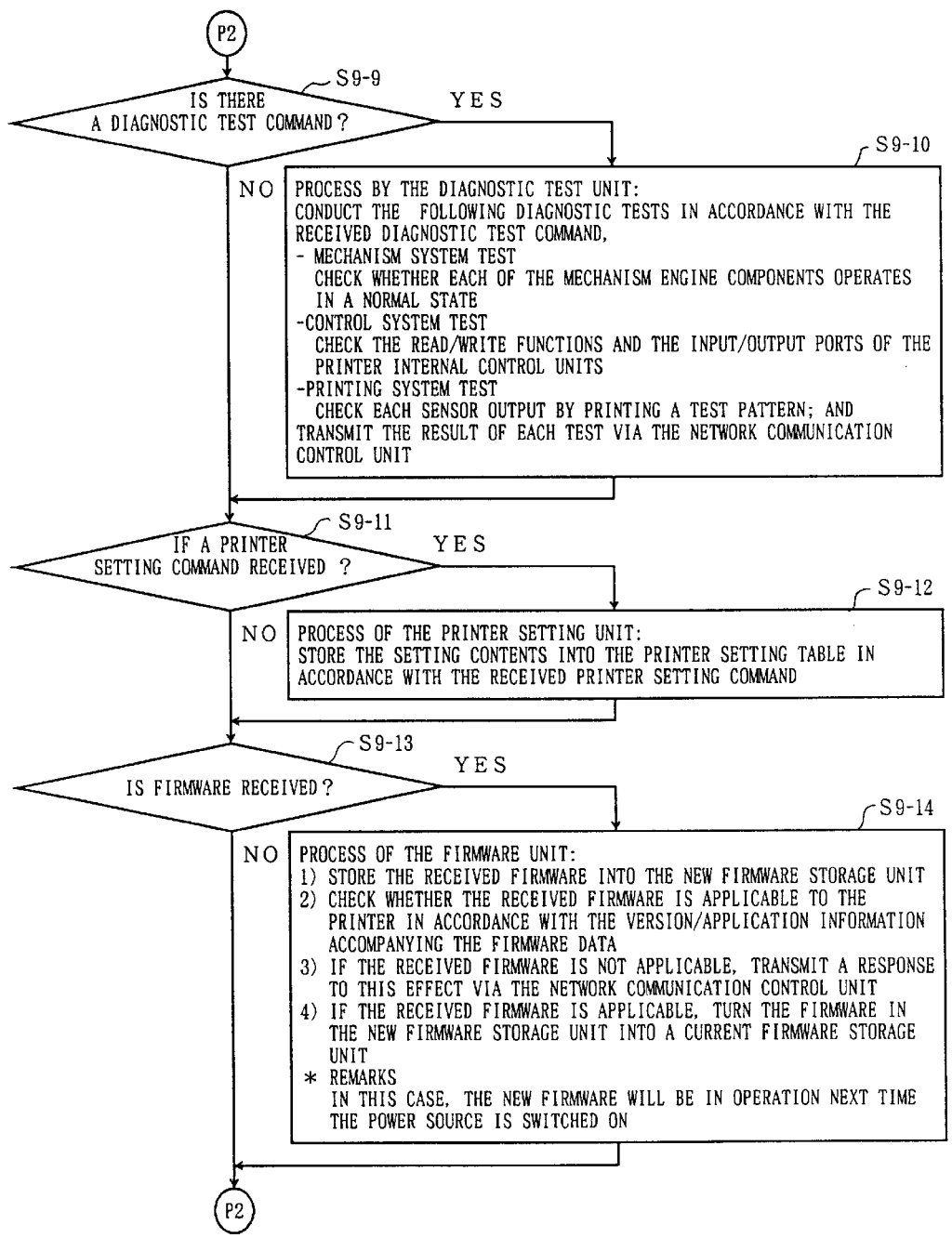
FIG. 41 is the flowchart (continued from FIG. 40) of the process carried out by the printer of the present invention.

FIGS. 40 and 41 show a flowchart of a process of a printer. The printers 3-1 to 3-n are connected to the network 2, and when the power source is turned on, an initial diagnosis is made (step S9-1). In the initial diagnosis, the printer is self-diagnosed. If any disorder is detected, a massage is displayed on the operator panel.

After the initial diagnosis, firmware is loaded (step S9-2). This is carried out by transferring the firmware from the current firmware storage unit 89 in the printer to the real operation firmware storage unit 88.

When the printing data is received from the network 2 (step S9-3), the printing system unit 72 performs a printing operation (step S9-4). In the printing operation in step S9-4, the printing system unit 72 interprets the printing data and commands, and then sends the interpreted results of the printing data and commands to the mechanism control unit 73. The mechanism control unit 73 controls the printer mechanism engine unit 74 to perform a printing operation in accordance with the interpreted results of the printing data and commands sent from the printing system unit 72. Here, the printing operation is controlled in accordance with the contents in the printer setting table. If any disorder is detected during the printing operation, a message is displayed on the operator panel.

If an event occurs in the printer (step S9-5), the trap control unit 79 reports the event to the local unit 11 (step S9-6).

The trap control unit 79 stores the contents of the event in the internal information table 81, and also reports the contents of the event to the local unit 11 via the network communication control unit 71 and the network 2.

When there is an inquiry about printer internal information from the local unit 11 (step S9-8), the polling control unit 82 sends the internal information stored in the internal information table 81 to the local unit 11 via the network 2 (step S9-8).

When a diagnostic test command is received from the local unit 11 (step S9-9), the diagnostic test unit 83 is started (step S9-10).

In response to the received diagnostic test command, the diagnostic test unit 83 conducts a mechanism system test, a control system test, and a printing system test. The mechanism system test is to check whether the mechanism engine components operate in a normal state. The control system test is to check the read/write functions of the RAM and the input/output ports of each control unit in the printer. The printing system test is to check each sensor output by printing a test pattern.

The result of each test by the diagnostic test unit 83 is transmitted to the local unit 11 via the network communication control unit 71 and the network 2.

When a printer setting command is received from the local unit 11 (step S9-11), the printer setting unit 84 is started (step S9-12).

In accordance with the printer setting command from the local unit 11, the printer setting unit 84 stores the setting contents into the printer setting table 85. The printer is controlled based on the setting information set in the printer setting table 85.

When firmware is received from the local unit 11 via the network 2 (step S9-13), the firmware applying unit 86 is started (step S9-14).

The firmware applying unit 86 stores the received firmware into the new firmware storage unit 90, and then checks whether the received firmware is applicable to the printer in accordance with the version/application information accompanying the received firmware. If the received firmware is not applicable to the printer, a response to this effect is sent to the local unit 11 via the network communication control unit 71. If the received firmware is applicable to the printer, the new firmware storage unit 90 is turned into a current firmware storage unit, and the current firmware storage unit 89 is turned into a new firmware storage unit.

In the above embodiment, electronic mail is also used to make process requests.

FIGS. 42A and 42B show the process requests by electronic mail. FIG. 42A shows the meanings of commands and subcommands, and FIG. 42B shows command statement examples.

The command statement "<Set> Response.Route.Mail. Address (**@..co.jp)" shown in FIG. 42B means "report the process result at the mail address @.**.co.jp" in accordance with the table shown in FIG. 42A.

The command statement "<Set> Target.Printer.Ip (*...)" means "designate a printer represented by the IP address *..." in accordance with the table shown in FIG. 42A.

The command statement "<Set> ActionTiming.Immediately" shown in FIG. 42B means "instruct immediate execution of the process" in accordance with the table shown in FIG. 42A.

The command statement "<Test> AllItem" means "test all items" in accordance with the command table shown in FIG. 42A.

The command statement "<Get> Test Result" means "transmit the test result" in accordance with the command table shown in FIG. 42A.

Process requests can be made not only through electronic mail but also through telephone.

Figure 43:
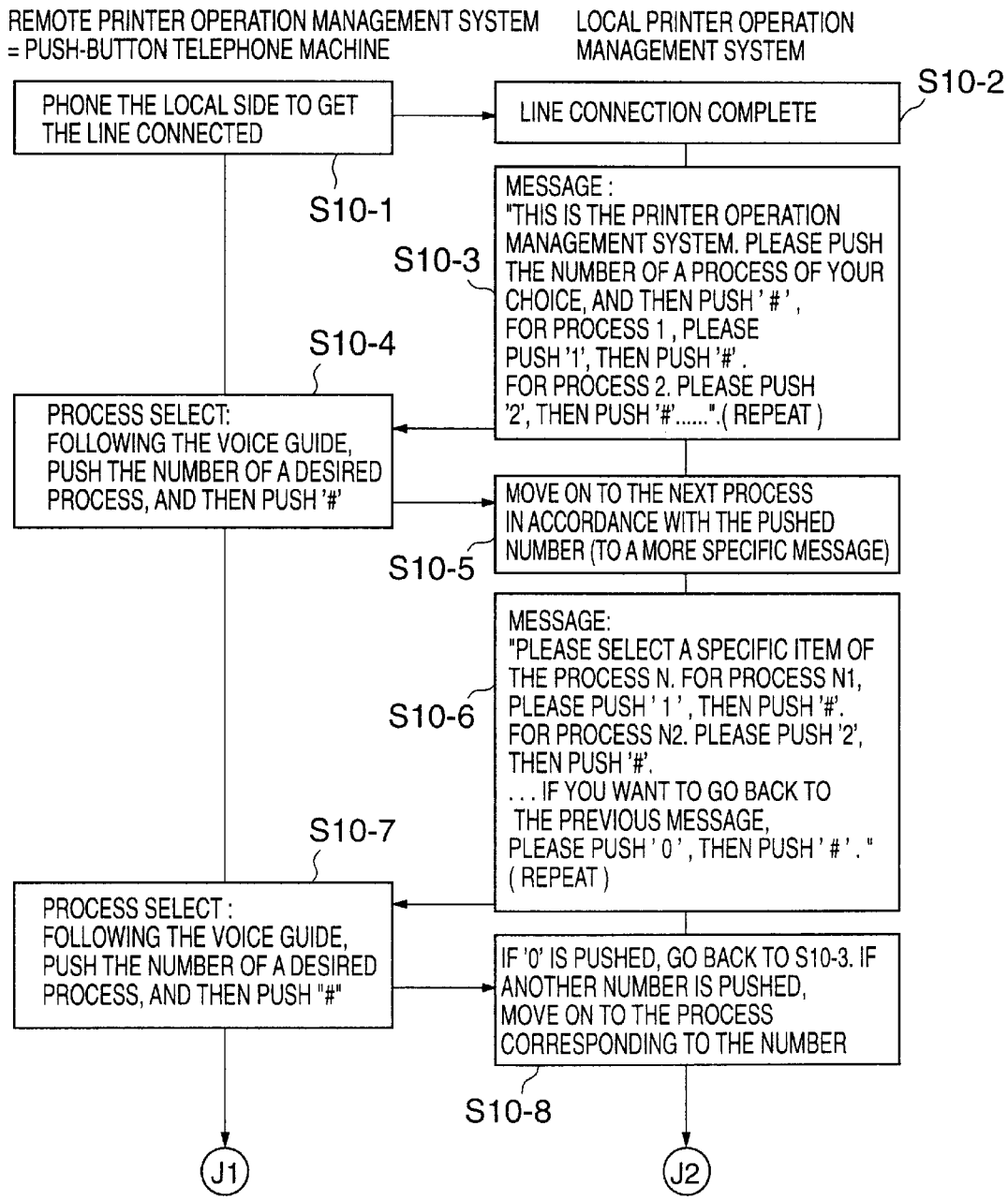
FIG. 43 is a flowchart of a process request through telephone in the present invention.
Figure 44:
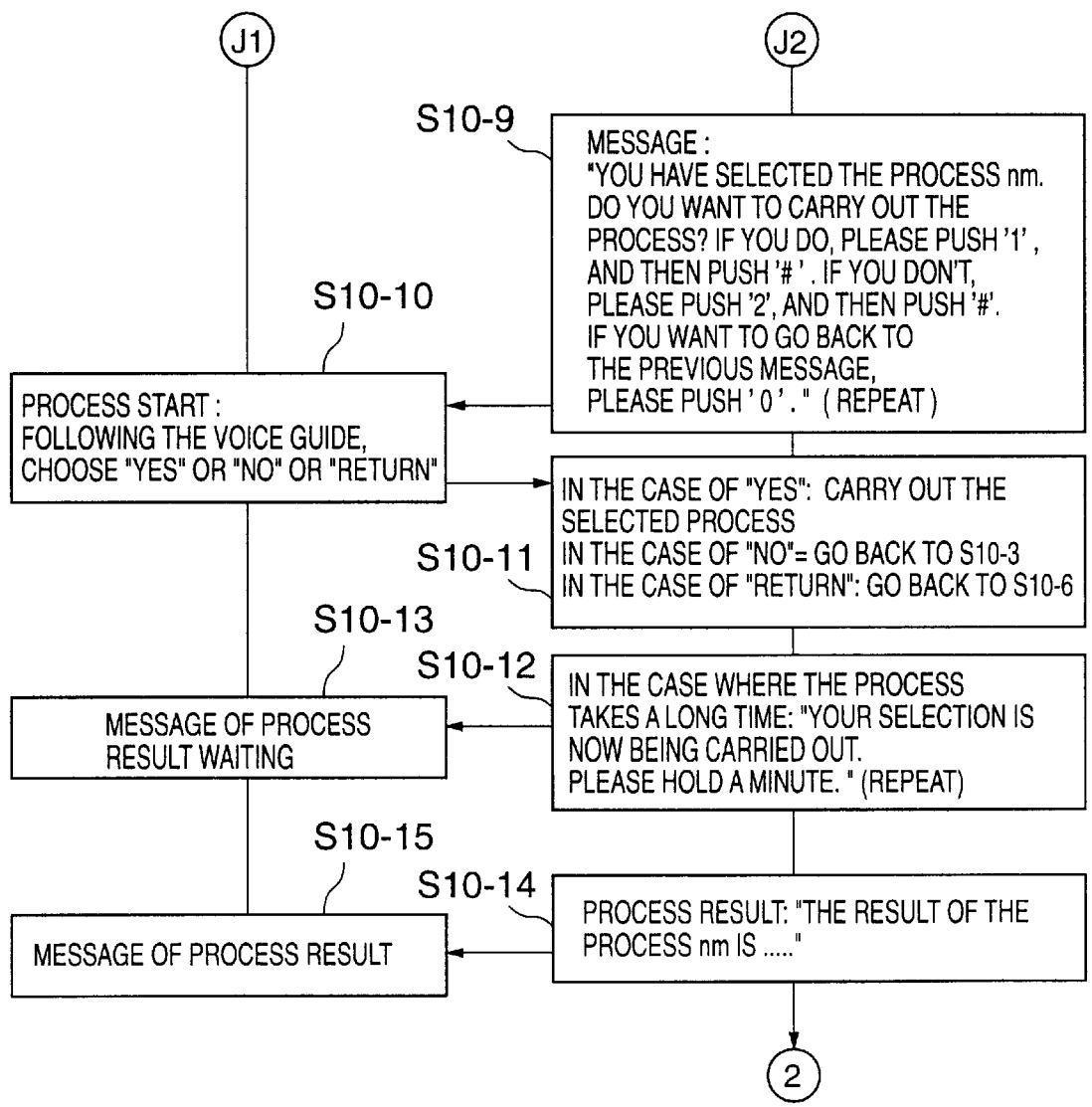
FIG. 44 is the flowchart (continued from FIG. 43) of the process request through telephone in the present invention.

FIGS. 43 and 44 are a flowchart of a process when a process request is made through telephone.

The remote unit 12 phones the local unit 11, and the line is connected (step S10-1). When the line is connected to the local unit 11 (step S10-2), the local unit 11 sends the remote unit 12 a message, "This is the printer operation management system. Please push the number of a process of your choice, and then push '#'. For process 1, please push '1', then push '#'. For process 2, please push '2', then push '#' . . . " (step S10-3).

When the operator listens to the message sent from the local unit 11, and performs a desired operation by the remote unit 12 (step S10-4), the local unit 11 starts a more specific process corresponding to the designated number (step S10-5).

The local unit 11 repeatedly sends the remote unit 12 a message, "Please select a specific item of the process N. For process N1, please push '1', then push '#'. For process N2, please push '2', then push '#' . . . If you want to go back to the previous message, please push '0', then push '#'. " (step S10-6).

After the operation is performed in the remote unit 12 in accordance with the message (step S10-7), the local unit 11 performs in accordance with the pushed number (step S10-8).

The local unit 11 next sends the remote unit 12 a message, "You have selected the process nm. Do you want to carry out the process? If you do, please push '1', and then push '#'. If you don't, please push '2', and then push '#'. If you want to go back to the previous message, please push '0'." (step S10-9).

After the operation is performed in the remote unit 12 in accordance with the message (step S10-10), the local unit 11 performs in accordance with the pushed number (step S10-11). If "1" is pushed, a process corresponding to the number "1" is carried out. If "2" is pushed, the operation goes back to step 10-3. If "0" is pushed, the operation goes back to step S10-6.

If the selected process takes the local unit 11 a long time, the local unit 11 repeatedly sends the remote unit 12 a message, "Your selection is now being carried out. Please hold a minute." (step S10-12). Here, the remote unit 12 is in a result waiting state (step S10-14).

When the process is completed, the local unit 11 sends the remote unit 12 a result, "The result of the process nm is . . . " (step S10-14). The remote unit 12 then receives the process result message (step S10-15).

As described so far, process execution can be instructed through telephone, and the process result can be received as a voice message. Although the peripheral equipment is printers in the above embodiment, it should be understood that this method is also applicable to other devices. Furthermore, processes to be carried out are not limited to those described above, but various commands can be set so that desired processes can be carried out. The communication means are not limited to electronic mail and telephone, but various communication devices can be employed. In the above embodiment, the local unit 11 is connected between the printers 3-1 to 3-n and the remote unit 12, so that various communication systems can be employed by simply increasing the number of communication units in the local unit 11.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The present application is based on Japanese priority application No. 10-307580, filed on Oct. 28, 1998, the entire contents of which are hereby incorporated by reference.

What is claimed is:

1. A peripheral equipment management device which is connected between peripheral equipment and a monitoring device for monitoring conditions of the peripheral equipment, and manages the conditions of the peripheral equipment, the peripheral equipment management device comprising:

a process execution unit which carries out a process for the peripheral equipment;

a transmission unit which transmits a process result from the process execution unit to the monitoring device; and said process execution unit including a part for controlling execution of the process for the peripheral equipment by using a process schedule generated on the basis of information sent from a device connected to said peripheral equipment management device, with the process schedule including a process table having a pointer to a process schedule stack and an address of peripheral equipment to be processed.

2. The peripheral equipment management device as claimed in claim 1, said device connected to said peripheral equipment management device comprising an execution setting unit which designates the process to be carried out by the process execution unit for the peripheral equipment.

3. The peripheral equipment management device as claimed in claim 1, said device connected to said peripheral equipment management device comprising a time setting unit which sets a time for the process execution unit to carry out the process for the peripheral equipment.

4. The peripheral equipment management device as claimed in claim 1, wherein the process execution unit carries out the process for the peripheral equipment at uniform intervals.

5. The peripheral equipment management device as claimed in claim 1, said device connected to said peripheral equipment management device comprising a peripheral equipment selecting unit which selects peripheral equipment for which the process is carried out by the process execution unit.

6. The peripheral equipment management device as claimed in claim 1, said device connected to said peripheral equipment management device comprising a transmission destination selecting unit which selects the monitoring device to which the transmission unit transmits the process result from the process execution unit.

7. The peripheral equipment management device as claimed in claim 1, further comprising a process result storage unit which stores the process result from the process execution unit.

8. A peripheral equipment which is managed by a management device, comprising:

an internal information detecting unit which detects internal conditions as internal information;

a reporting unit which reports the internal information detected by the internal information detecting unit to the management device; and a communication control unit by which the peripheral equipment communicates with a peripheral equipment management device which is connected between the peripheral equipment and a monitoring device for monitoring conditions of the peripheral equipment, and manages the conditions of the peripheral equipment, the peripheral equipment management device including:

a process execution unit which carries out a process for the peripheral equipment;

a transmission unit which transmits a process result from the process execution unit to the monitoring device; and said process execution unit including a part for controlling execution of the process for the peripheral equipment by using a process schedule generated on the basis of information sent from a device connected to said peripheral equipment management device, with the process schedule including a process table having a pointer to a process schedule stack and an address of peripheral equipment to be processed.

9. The peripheral equipment as claimed in claim 8, wherein the reporting unit reports the internal information to the management device when the internal information the internal information detecting unit detects the internal information.

10. The peripheral equipment as claimed in claim 8, wherein the reporting unit reports the internal information detected by the internal information detecting unit to the management device in accordance with an instruction from the management device.

11. The peripheral equipment as claimed in claim 8, further comprising an internal information storage unit which stores the internal information detected by the internal information detecting unit.

12. A peripheral equipment management method for managing conditions of peripheral equipment and reporting the conditions of the peripheral equipment to a monitoring device, the method comprising:

carrying out a predetermined process for the peripheral equipment;

transmitting a process result of the carried-out process to the monitoring device, and wherein the predetermined process is carried out for the peripheral equipment by a peripheral equipment management device, separate from the peripheral equipment, in accordance with a process schedule based on information sent from a remote device, with the process schedule including a process table having a pointer to a process schedule stack and an address of peripheral equipment to be processed.

13. The peripheral equipment management method as claimed in claim 12, further comprising the step of storing the process result of the carried-out process.

14. The peripheral equipment management method as claimed in claim 12, wherein the process result of the carried-out process is transmitted to the monitoring device in accordance with a predetermined schedule.

15. The peripheral equipment management method as claimed in claim 12, wherein the predetermined process is carried out for the peripheral equipment at uniform intervals.

16. The peripheral equipment management method as claimed in claim 12, wherein the process result of the carried-out process is transmitted to the monitoring device at uniform intervals.

17. A peripheral equipment management device which is connected between peripheral equipment and a monitoring device for monitoring conditions of the peripheral equipment, and manages the conditions of the peripheral equipment, the peripheral equipment management device comprising:

a process execution unit which carries out a process for the peripheral equipment;

a transmission unit which transmits a process result from the process execution unit to the monitoring device; and said process execution unit including a part for controlling execution of the process for the peripheral equipment by using a process schedule generated on the basis of information sent from a device connected to said peripheral equipment management device, with the process schedule including a process table, wherein the process table includes a pointer to a process schedule stack and an address of a peripheral equipment to be processed.

18. The peripheral equipment management device as claimed in claim 17, the process schedule stack including process codes and control codes, wherein each control code is used for controlling execution of a process corresponding to a process code.

* * * * *

UNITED STATES PATENT AND TRADEMARK OFFICE
CERTIFICATE OF CORRECTION

PATENT NO. : 6,735,641 B1
DATED : May 11, 2004
INVENTOR(S) : Sumitake Kobayashi et al.

It is certified that error appears in the above-identified patent and that said Letters Patent is hereby corrected as shown below:

Column 22,
Line 14, after "schedule" insert -- , as generated --.

Signed and Sealed this

Ninth Day of November, 2004

JON W. DUDAS
*Director of the United States Patent and Trademark Office*